United States Patent
Luo et al.

(10) Patent No.: US 10,719,405 B2
(45) Date of Patent: Jul. 21, 2020

(54) FOREVER INCREMENTAL BACKUPS FOR DATABASE AND FILE SERVERS

(71) Applicant: RUBRIK, INC., Palo Alto, CA (US)

(72) Inventors: Jiangbin Luo, Cupertino, CA (US); Biswaroop Palit, Redwood City, CA (US); Guilherme Vale Ferreira Menezes, Santa Clara, CA (US)

(73) Assignee: RUBRIK, INC., Palo Alto, CA (US)

( * ) Notice: Subject to any disclaimer, the term of this patent is extended or adjusted under 35 U.S.C. 154(b) by 269 days.

(21) Appl. No.: 15/837,998

(22) Filed: Dec. 11, 2017

(65) Prior Publication Data
US 2019/0179711 A1 Jun. 13, 2019

(51) Int. Cl.
G06F 11/14 (2006.01)

(52) U.S. Cl.
CPC ...... *G06F 11/1451* (2013.01); *G06F 11/1464* (2013.01); *G06F 2201/84* (2013.01)

(58) Field of Classification Search
CPC ............. G06F 11/1451; G06F 11/1464; G06F 2201/84; G06F 11/1453; G06F 2201/815
See application file for complete search history.

(56) References Cited

U.S. PATENT DOCUMENTS

| | | | | |
|---|---|---|---|---|
| 7,600,125 | B1 * | 10/2009 | Stringham | G06F 11/1004 380/229 |
| 2007/0266062 | A1 * | 11/2007 | Young | G06F 11/1004 |
| 2014/0095817 | A1 * | 4/2014 | Hsu | G06F 11/1438 711/162 |

\* cited by examiner

*Primary Examiner* — Irete F Ehichioya
*Assistant Examiner* — Xiaoqin Hu
(74) *Attorney, Agent, or Firm* — Schwegman Lundberg & Woessner, P.A.

(57) ABSTRACT

Methods and systems for efficiently capturing snapshots of a computing application or environment over time and transferring the snapshots to an integrated data management and storage system are described. A snapshot agent may detect that one or more electronic files associated with the computing application or environment are greater than a threshold file size and in response perform an incremental backup optimization in which the snapshot agent may identify files that have been touched since a previous snapshot by accessing file system metadata (e.g., last modified timestamps) or utilizing a tracking agent to detect potential file changes that have occurred since the previous snapshot was captured. The snapshot agent may then generate fingerprints for data blocks of the touched files, which may reduce the total number of fingerprints needing to be generated to identify the changed data blocks corresponding with a current snapshot to be transferred.

15 Claims, 21 Drawing Sheets

| Versions of Virtual Machine A | Stored Files | |
|---|---|---|
| Version V1 / Time T1 | R4 | ⎫ |
| Version V2 / Time T2 | R3 | ⎬ Reverse incrementals |
| Version V3 / Time T3 | R2 | ⎪ |
| Version V4 / Time T4 | R1 | ⎭ |
| Version V5 / Time T5 | Base | } Full image |
| Version V6 / Time T6 | F1 | ⎫ Forward incrementals |
| Version V7 / Time T7 | F2 | ⎭ |

FIG. 2A

```
Virtual Machine A, Version V7 {
    pBase,       ⟶  /snapshots/VM_A/s5/s5.full
    pF1,         ⟶  /snapshots/VM_A/s6/s6.delta
    pF2          ⟶  /snapshots/VM_A/s7/s7.delta
}
```

FIG. 2B

```
Virtual Machine A, Version V2 {
    pBase,       ⟶  /snapshots/VM_A/s5/s5.full
    pR1,         ⟶  /snapshots/VM_A/s4/s4.delta
    pR2,         ⟶  /snapshots/VM_A/s3/s3.delta
    pR3          ⟶  /snapshots/VM_A/s2/s2.delta
}
```

FIG. 2C

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

```
Virtual Machine B, Version V1 {
    pBase2,
    pR11,
    pR12,
    pR1,
    pR2,
    pF3
}
```

```
Virtual Machine C, Version V2 {
    pBase2,
    pR11,
    pF5,
    pF6
}
```

```
Virtual Machine A, Version VS {
    pBaseA,
    pR4,
}
```

```
Virtual Machine A, Version VU {
    pBaseB,
    pR1,
    pR2,
    pR3
}
```

```
Virtual Machine A, Version VU {
    pBaseA,
    pF9
}
```

FOREVER INCREMENTAL BACKUPS FOR DATABASE AND FILE SERVERS

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

DETAILED DESCRIPTION

Figure 1A:
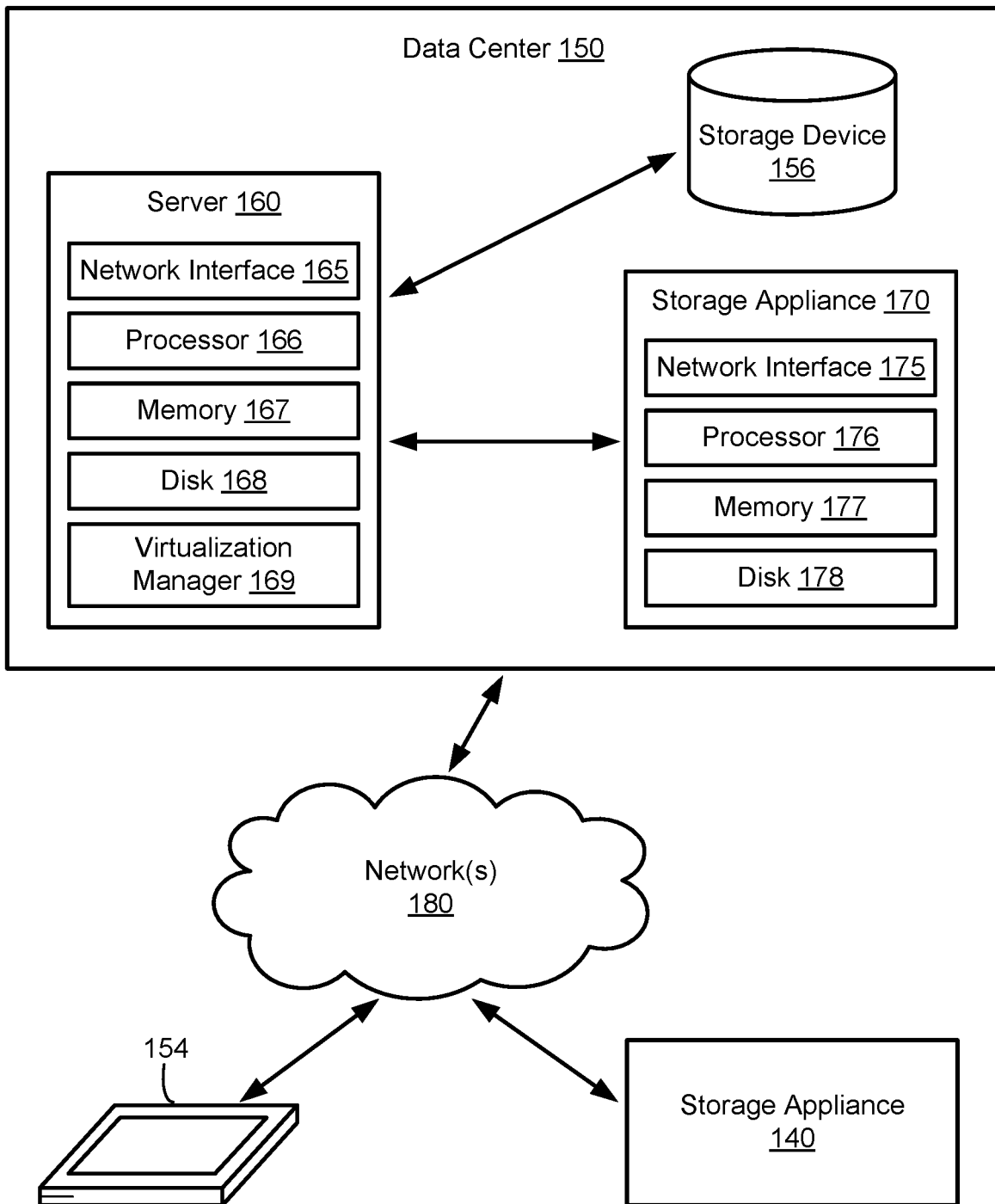
FIG. 1A depicts one embodiment of a networked computing environment.

Technology is described for efficiently capturing snapshots of electronic files corresponding with a computing application (e.g., a database server or database application) or a computing environment (e.g., a desktop computing environment or virtualized computing environment) over time and transferring the snapshots to an integrated data management and storage system. In some cases, a snapshot agent (e.g., running on the same real machine or the same virtual machine as the computing application) may identify and transfer changed data blocks corresponding with different snapshots or different point in time versions of one or more electronic files corresponding with the computing application or the computing environment to the integrated data management and storage system. The snapshot agent may detect that the one or more electronic files (e.g., a database data file associated with a database application or a virtual disk file associated with a virtual machine) are greater than a threshold file size (e.g., the combined file sizes of the one or more electronic files may be greater than 1 GB) and in response perform an incremental backup optimization in which the snapshot agent may identify files that have been touched since a previous snapshot by accessing file system metadata (e.g., leveraging last modified timestamps or time-created timestamps) or utilizing a tracking agent to detect potential file changes that have occurred since the previous snapshot was captured. In one example, the tracking agent may have been enabled just before the previous snapshot was captured and started tracking files that were touched or modified since the tracking agent was enabled. The snapshot agent may then generate fingerprints (or cryptographic signatures) for data blocks (e.g., 64 KB or 128 KB data blocks) of the touched files, which may reduce the total number of fingerprints needing to be generated to identify the changed data blocks corresponding with a current snapshot to be captured, stored, and transferred to the integrated data management and storage system. A fingerprint (or fingerprint value) may be used to uniquely or substantially identify the data within a data block. Fingerprint values may be compared in order to determine whether two data blocks contain identical data.

In some cases, a database application may provide the ability to acquire full or differential backups for a database, but not the ability to acquire incremental backups for the database. A differential backup may comprise the cumulative changes made to the database since the last full backup. One benefit of a differential backup is that only the last full backup and the last differential backup are needed to restore the database to its last backed-up version. An incremental backup may comprise the data changes made to the database since a preceding backup copy was captured. In this case, restoration of the database to a particular point in time version of the database may require the last full backup plus a chain of one or more incremental backups that derive from the last full backup.

In some embodiments, a snapshot agent may reside on or be executed on the same machine as the database application in order to generate and transfer incremental backups for the database using the full and differential backup capability of the database application. In one example, the database application may be running on a virtual machine and the snapshot agent may be loaded onto the virtual machine and acquire full and differential snapshot data for the database from the database application. The snapshot agent may acquire an instruction from an integrated data management and storage system to capture and transfer a current snapshot of the database and in response may acquire a first differential backup or a first full backup of the database corresponding with a previous snapshot of the database and a second differential backup or a second full backup of the database corresponding with the current snapshot of the database. The snapshot agent may generate a first set of fingerprints for data blocks corresponding with the first differential or full backup using a cryptographic hash algorithm and generate a second set of fingerprints for data blocks corresponding with the second differential or full backup using the same cryptographic hash algorithm. The cryptographic hash algorithm may comprise MD5 or one of the Secure Hash Algorithm (SHA) family of algorithms, such as SHA-1, SHA-256, or SHA-512. The snapshot agent may then compare the first set of fingerprints with the second set of fingerprints in order to identify the set of changed data blocks that have occurred between the previous snapshot of the database and the current snapshot of the database. The snapshot agent may transfer the set of changed data blocks to the integrated data management and storage system along with the generated fingerprints for the set of changed data blocks. The set of changed data blocks may comprise an incremental backup for the current snapshot of the database. Transferring the set of changed data blocks rather than the second differential backup or the second full backup of the database may significantly reduce the amount of data that is transferred over a network to store the current snapshot and reduce the amount of data that must be stored to backup the current snapshot of the database.

In some cases, the snapshot agent may access file system metadata prior to generating the second set of fingerprints for the second differential backup in order to reduce the total number of fingerprints needing to be generated as fingerprints (or signatures) may be generated for only those files that have been created, touched, and/or modified since the previous snapshot of the database. In one example, the file system metadata may be acquired from a directory-level table or a system-level table, such as a Master File Table (MFT) for a New Technology File System (NTFS) file system or an inode table for a Unix-based file system, which may provide metadata information associated with a file stored using the file system including the size of the file or portion thereof and time stamps for when the file or portion thereof was first created, last accessed, and/or last modified. The file system may comprise a Linux file system, such as the ext4 journaling file system, or a Windows file system, such as the FAT32 file system or NTFS, and the file system metadata associated with a file managed by the file system may include the name of the file or a file identifier, the length of the contents of the file or the number of blocks allocated for the file, the location of the file (e.g., within a folder hierarchy), a timestamp associated with when the file was first created, and a timestamp associated with when the file was last accessed or modified.

In some embodiments, the sizes of the data blocks for which fingerprints or signatures are generated may be adjusted over time based on the file size or the on-disk size of an electronic file associated with the data blocks (which may increase or decrease over time as data is added to or deleted from the electronic file), the type of hash algorithm or signature generation method being applied to the data blocks, an estimated time to compute signatures for the data blocks (which may vary over time based on CPU usage), and/or the amount of time that has passed since the previous snapshot was captured. In one example, if an electronic file is below a threshold file size (e.g., is less than 1 GB), then the data block size may be set to a first data block size (e.g., 64 KB); however, if the electronic file is greater than or equal to the threshold file size, then the data block size may be set to a second data block size (e.g., 256 KB) greater than the first data block size. In another example, if an electronic file is below a threshold file size (e.g., is less than 4 GB), then a first signature generation method (e.g., SHA-256) may be applied to the data blocks of the electronic file; however, if the electronic file is greater than or equal to the threshold file size, then a second signature generation method (e.g., SHA-1) different from the first signature generation method may be applied to the data blocks of the electronic file. In another example, if less than a threshold amount of time has passed since the previous snapshot was captured (e.g., less than one hour), then the data block size may be set to a first data block size (e.g., 128 KB); however, if more than the threshold amount of time has passed since the previous snapshot was captured, then the data block size may be set to a second data block size (e.g., 64 KB) different from the first data block size. The second data block size may be less than the first data block size. In another example, if less than a threshold amount of time has passed since the previous snapshot was captured (e.g., less than four hours), then a first signature generation method (e.g., SHA-256) may be applied to the data blocks of the electronic file; however, if more than the threshold amount of time has passed since the previous snapshot was captured, then a second signature generation method (e.g., MD5 or SHA-1) different from the first signature generation method may be applied to the data blocks of the electronic file. The second signature generation method may generate a smaller signature or a smaller-sized fingerprint than the first signature generation method. For example, the outputted fingerprint size using the second signature generation method may comprise 128 bits or 160 bits, while the outputted fingerprint size using the first signature generation method may comprise 256 bits.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
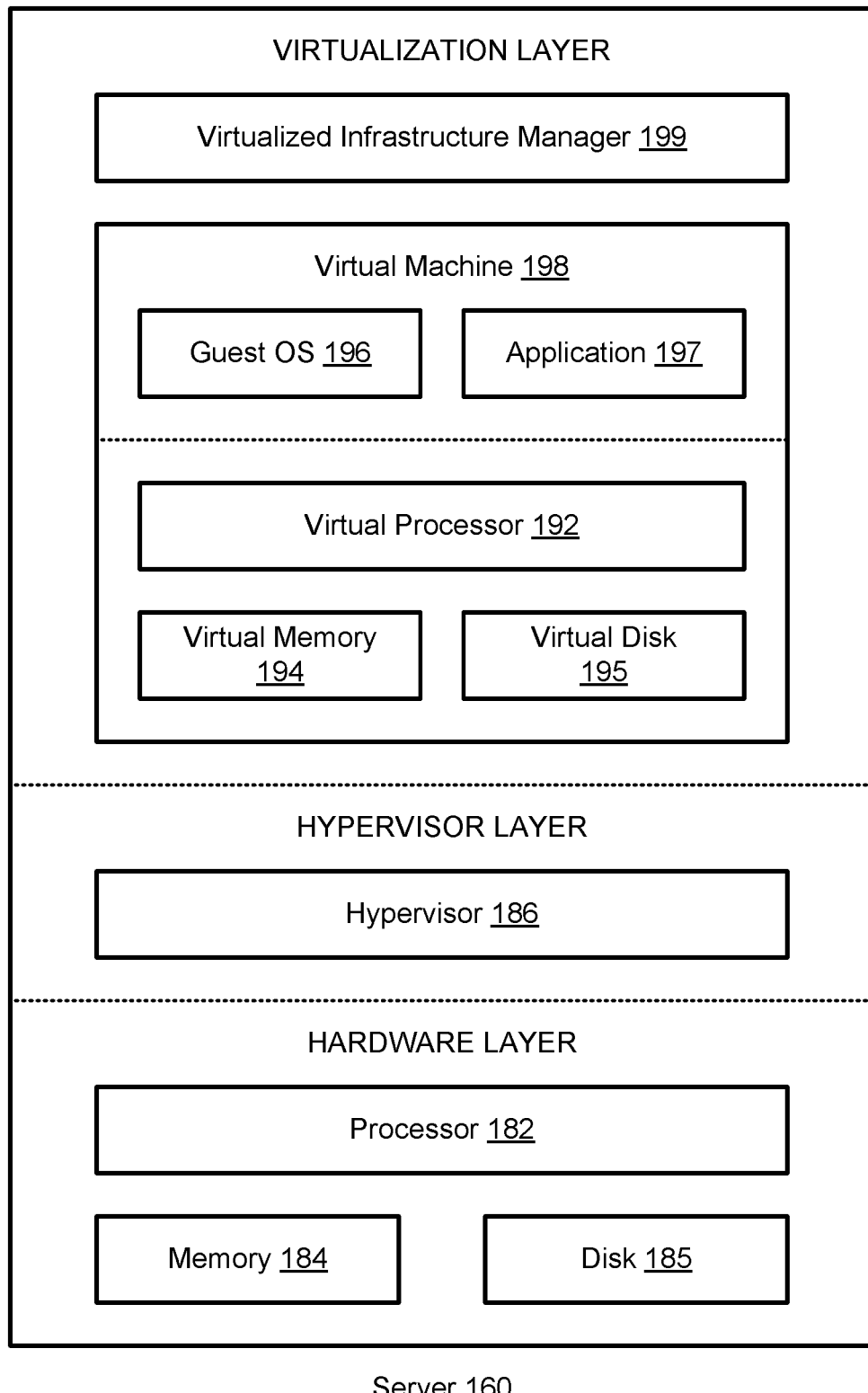
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
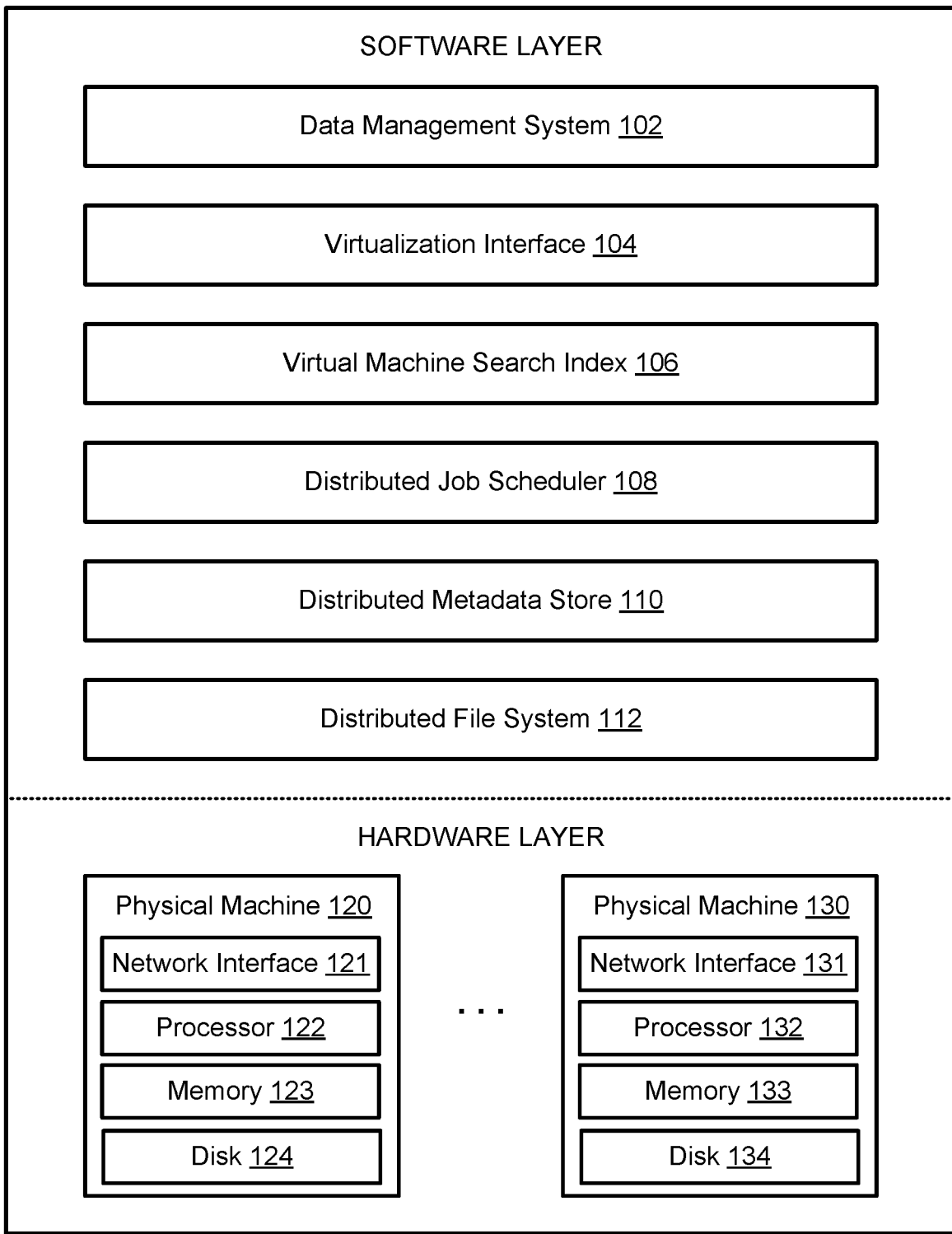
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
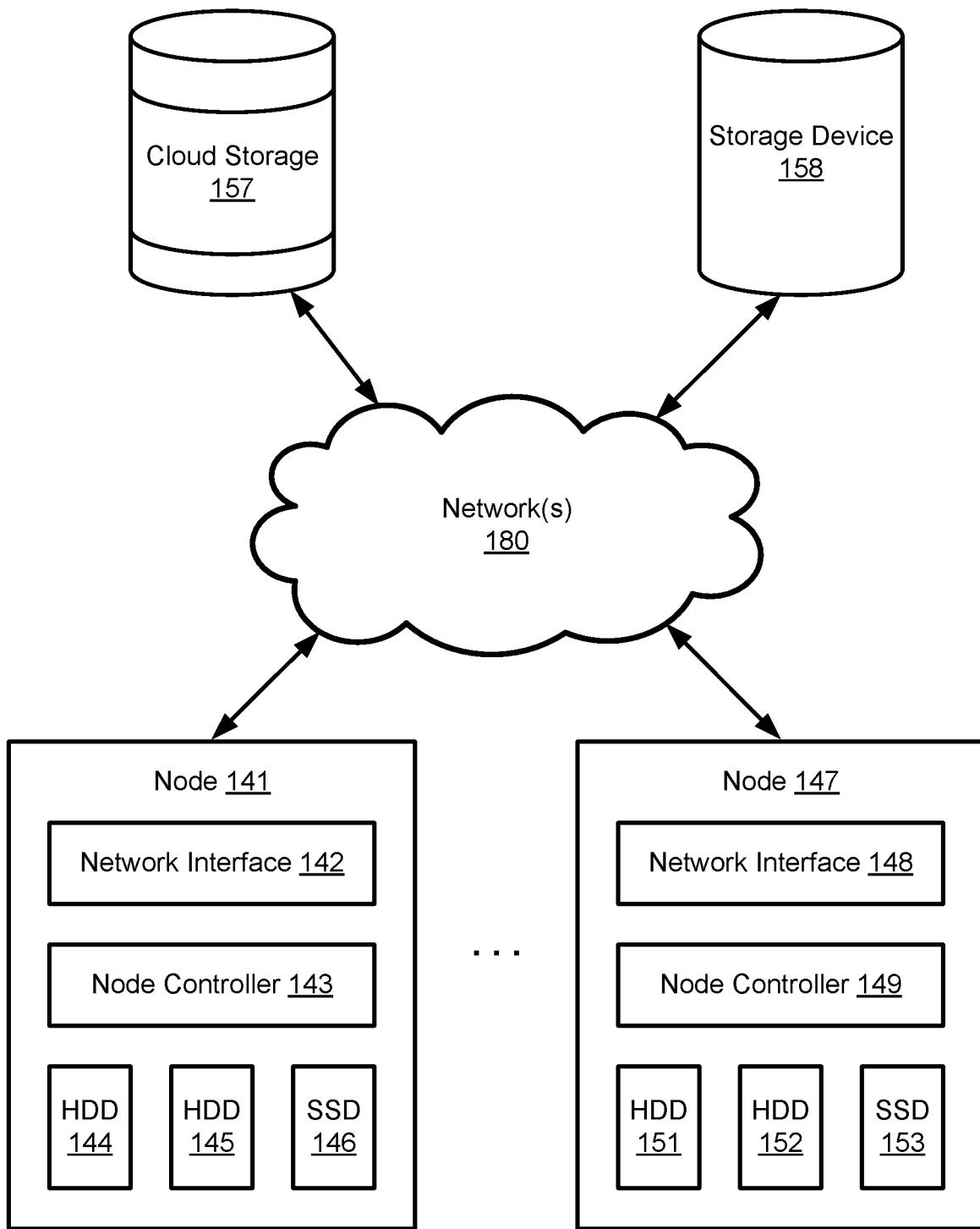
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2D, 2E, 2F:
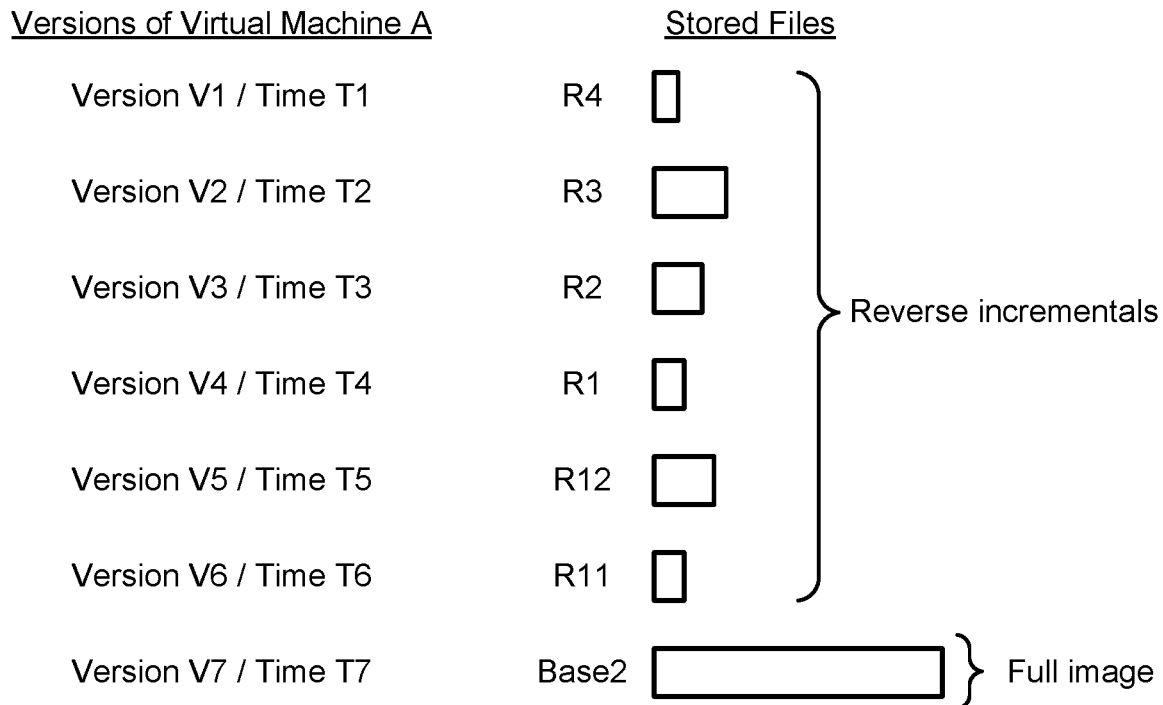
FIGS. 2A-2Q depict various embodiments of sets of files and data structures associated with managing and storing snapshots of virtual machines.
Figures 2G, 2H, 2I:
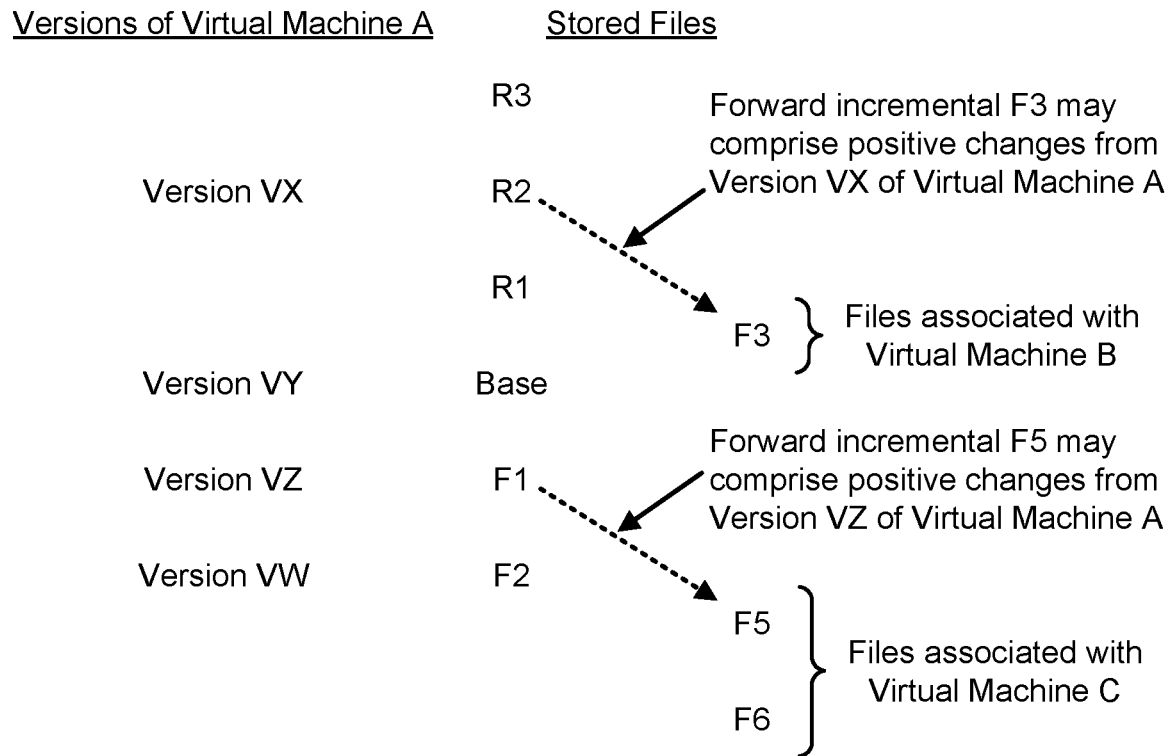
Figures 2J, 2K, 2L:
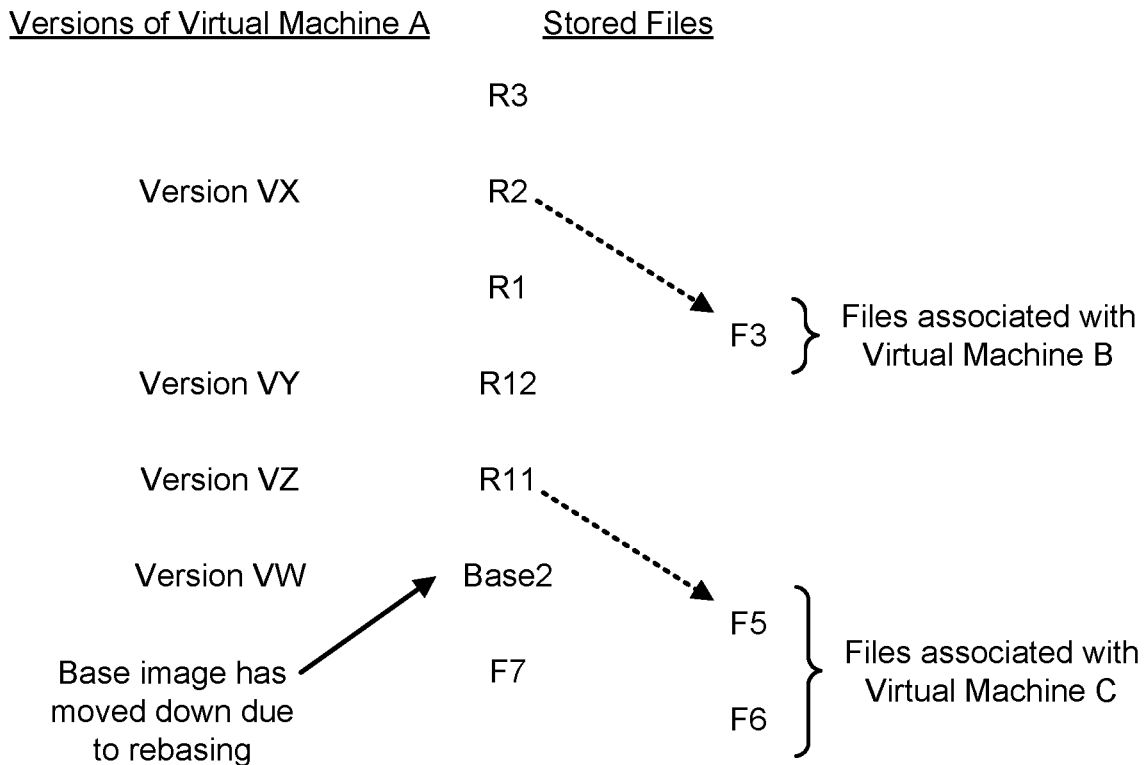
Figures 2M, 2N, 2O:
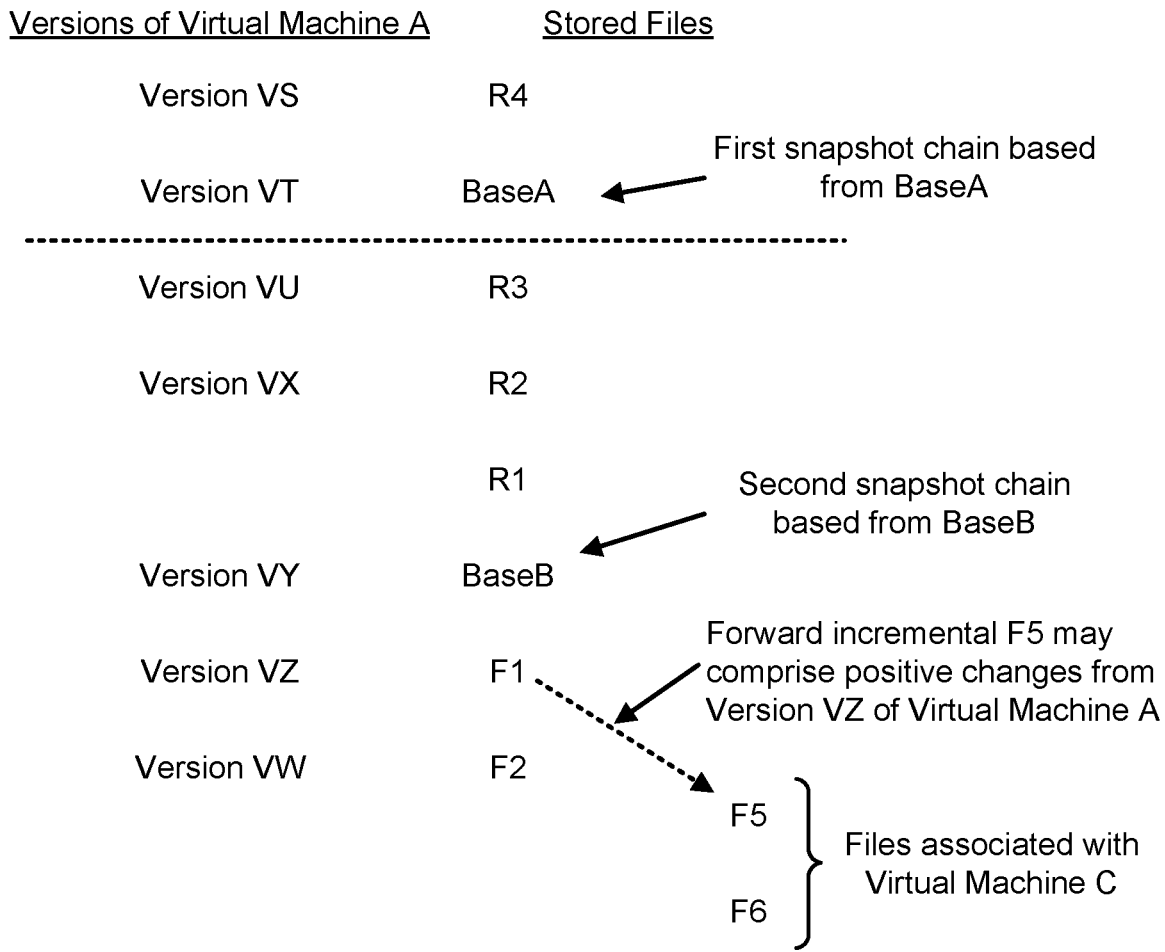
Figures 2P, 2Q:
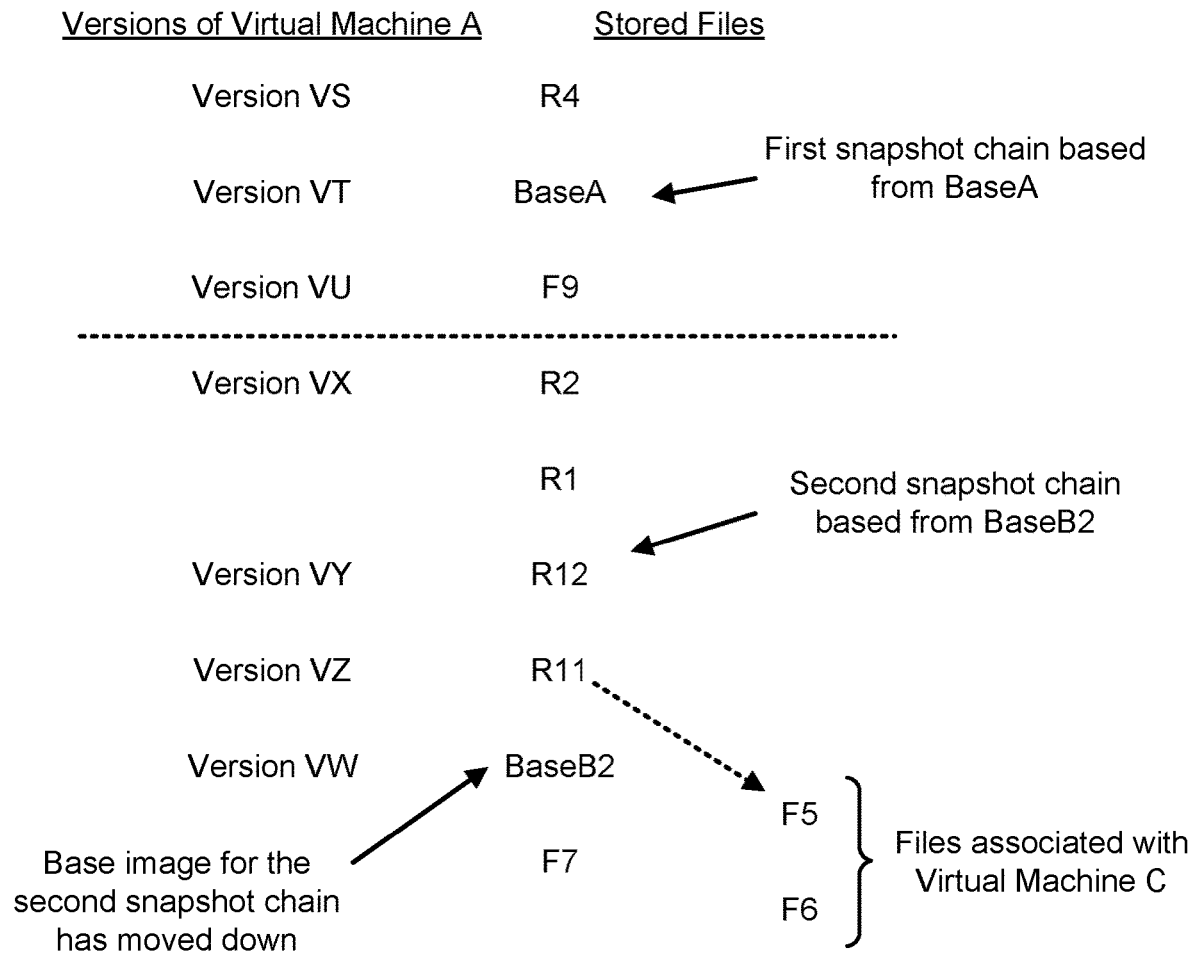

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6. The forward incremental F1 may include one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
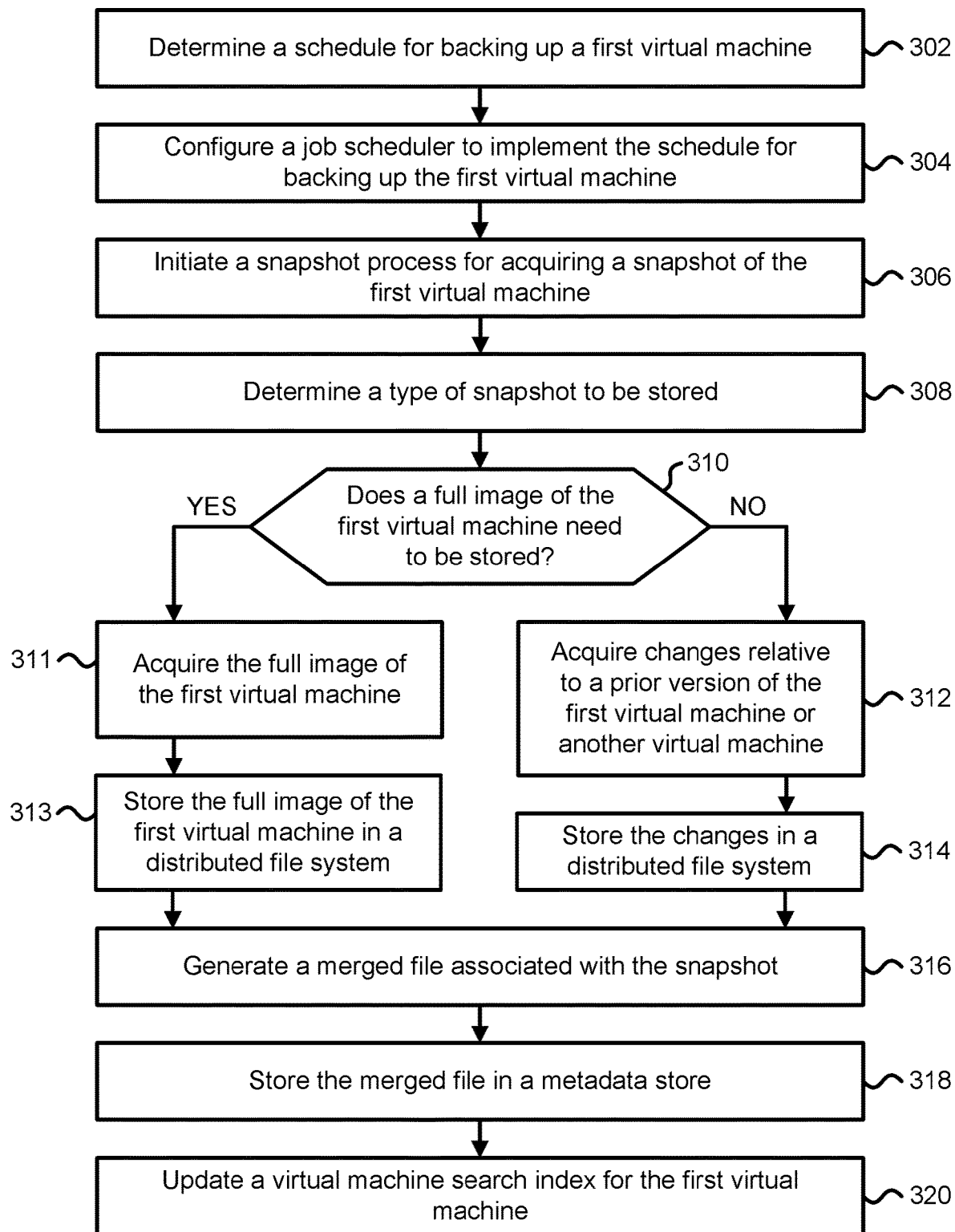
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
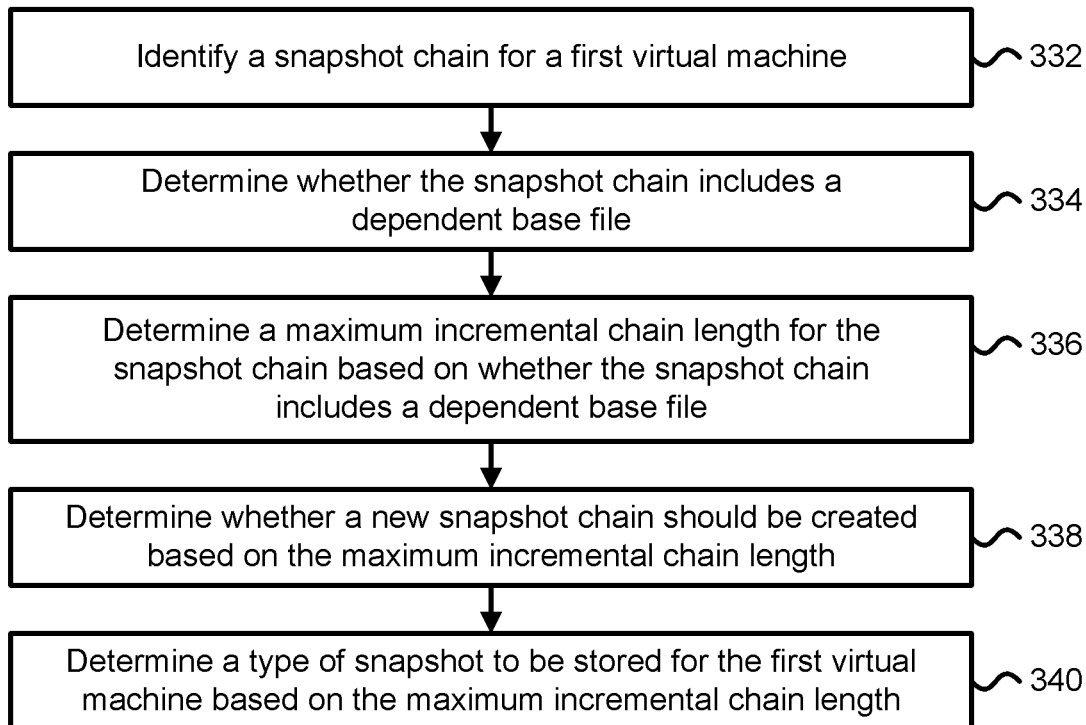
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
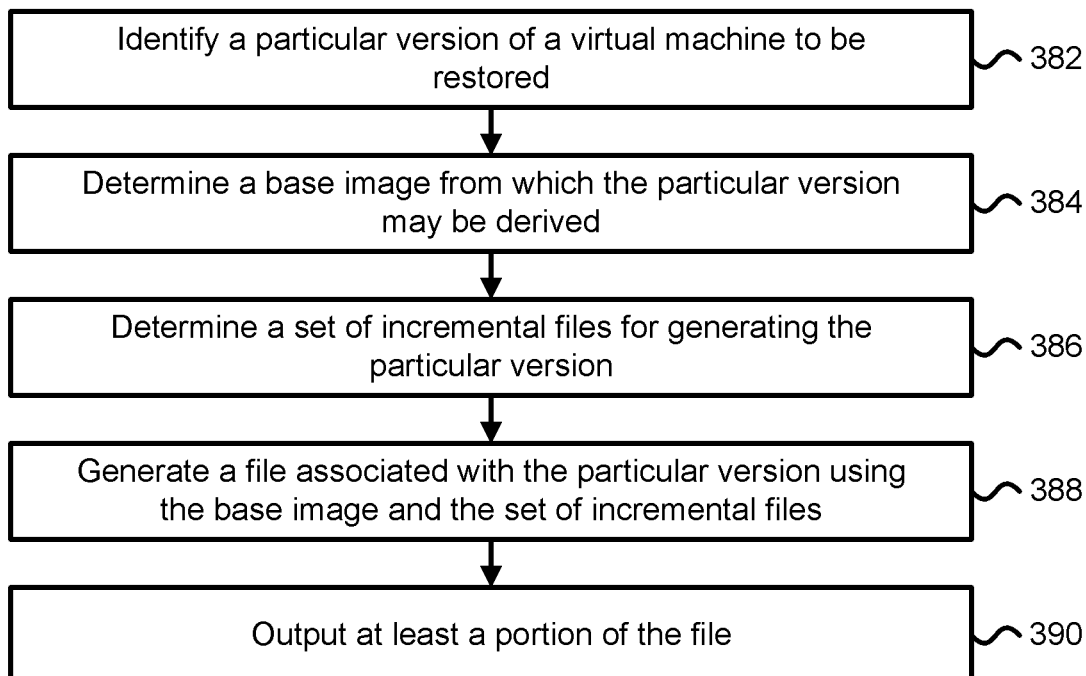
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

Figure 4A:
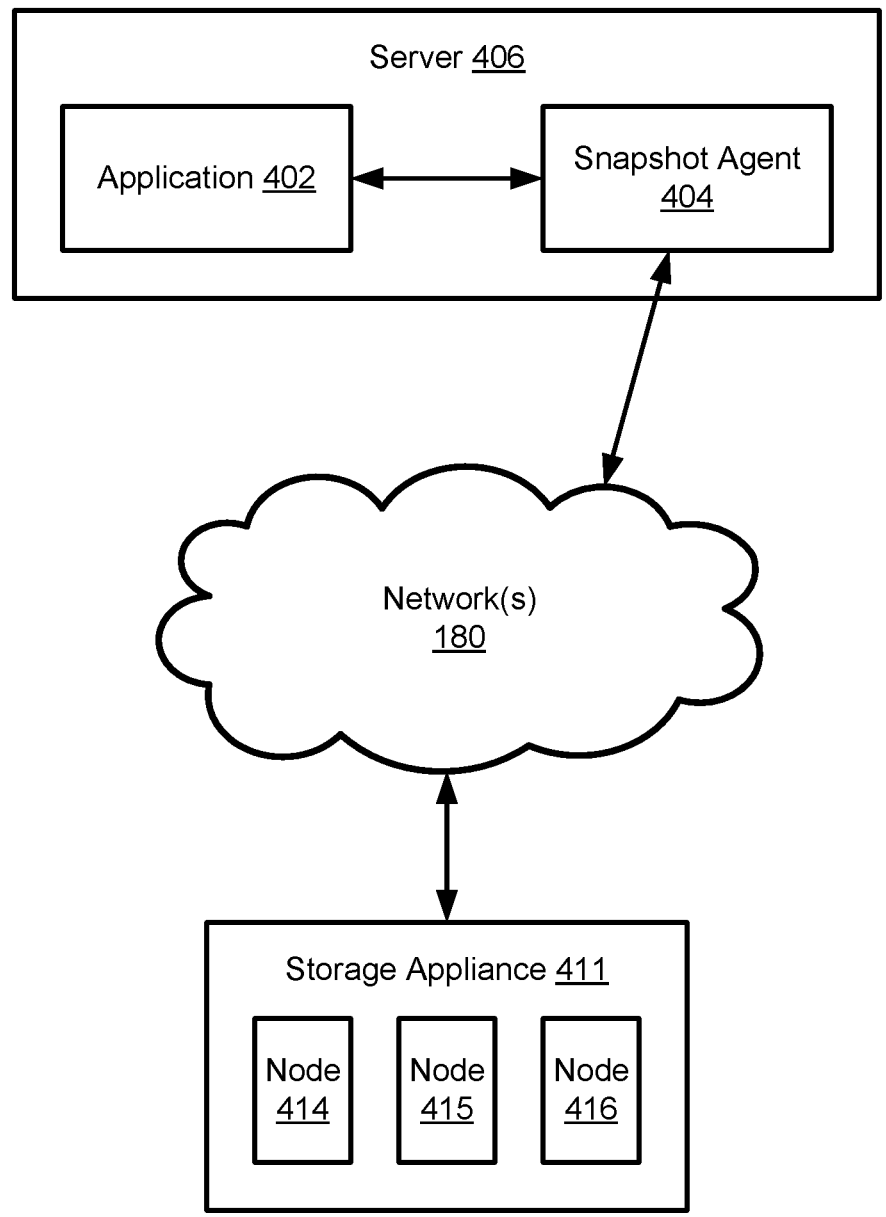
FIG. 4A depicts one embodiment of a portion of an integrated data management and storage system that includes a storage appliance in communication with one or more servers.

FIG. 4A depicts one embodiment of a portion of an integrated data management and storage system that includes a storage appliance 411 in communication with one or more servers via one or more networks 180. The storage appliance 411 may correspond with storage appliance 170 in FIG. 1A or storage appliance 140 in FIG. 1A. The storage appliance 411 includes a cluster of data storage nodes that are networked together and present themselves as a unified data storage system. The cluster of data storage nodes includes nodes 414-416. In one example, node 414 may correspond with node 141 in FIG. 1D. In some cases, the storage appliance 411 may comprise a hardware storage appliance. In other cases, the storage appliance 411 may comprise a virtual storage appliance that includes virtual data storage nodes. The one or more servers include server 406. The server 406 may correspond with server 160 in FIG. 1A.

As depicted, the server 406 may run computing application 402 (e.g., a database application for managing a database) and snapshot agent 404. In some cases, the snapshot agent 404 may have been uploaded from the storage appliance 411 and may be enabled or disabled by the storage appliance 411 over time. The snapshot agent 404 may acquire one or more electronic files or snapshot information associated with the one or more electronic files from the computing application 402. The snapshot information may include full and/or differential snapshot data. In one example, the one or more electronic files may comprise a database file for a database and the snapshot information may comprise a differential backup of the database file.

In one embodiment, the computing application 402 may comprise a database application that manages a database and the snapshot agent 404 may acquire one or more electronic files corresponding with a first point in time version of the database from the database application. The snapshot agent 404 may acquire a database file for the database from the computing application 402 or acquire a full or differential backup of the database from the computing application 402. The determination of whether the snapshot agent 404 acquires the database file or the full or differential backup may depend on a file size of the database file. The database file may comprise a text file or a binary file. The snapshot agent 404 may transfer one or more changed data blocks corresponding with the first point in time version of the database to the storage appliance 411. The one or more changed data blocks may be identified by the snapshot agent 404 by generating and comparing fingerprints or signatures for data blocks of the database file with previously generated fingerprints or signatures associated with earlier point in time versions of the database file captured prior to the first point in time.

Figure 4B:
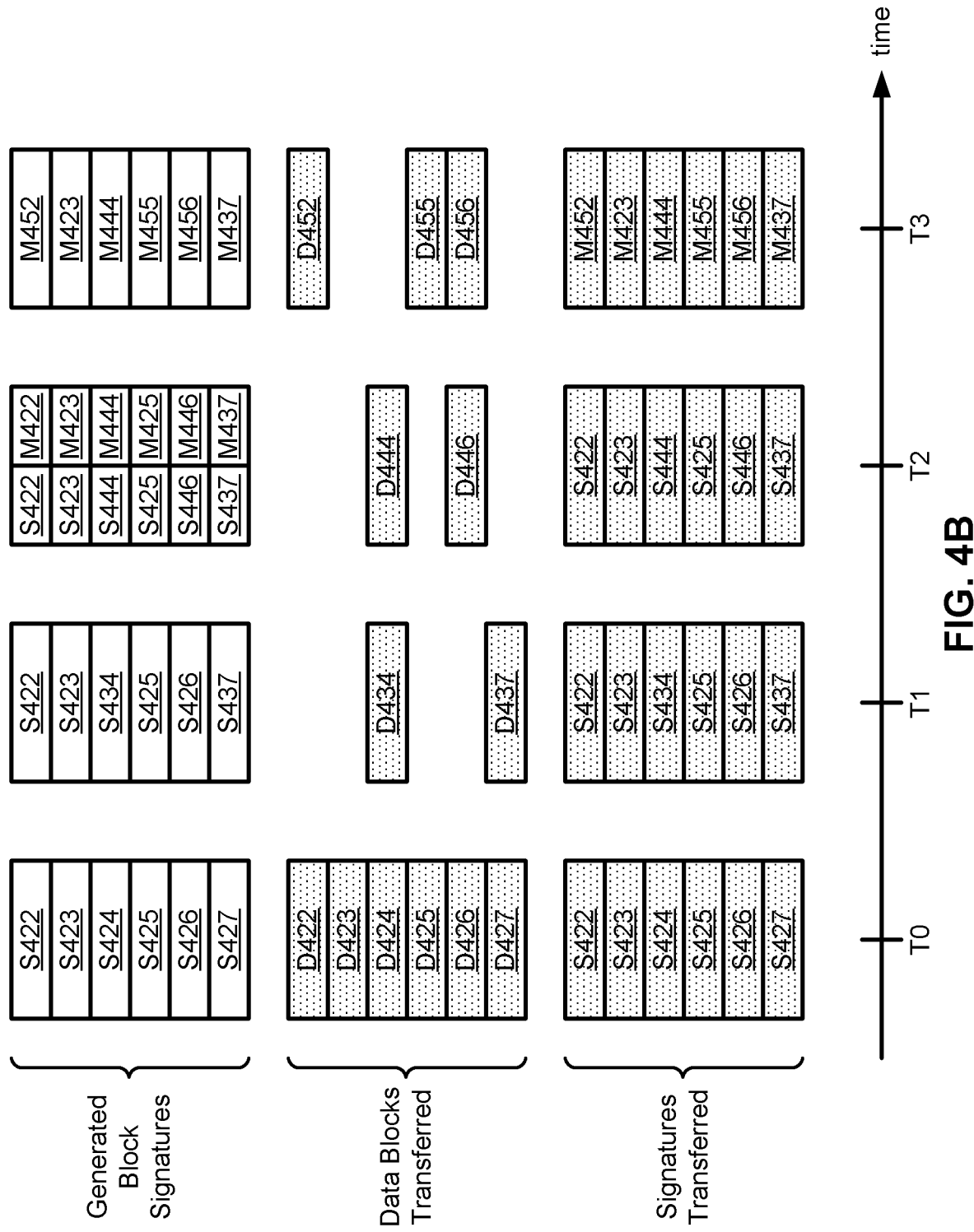
FIG. 4B depicts one embodiment of data blocks corresponding with portions of one or more electronic files at four different points in time and corresponding signatures generated from the data blocks.

FIG. 4B depicts one embodiment of data blocks corresponding with portions of one or more electronic files at four different points in time and corresponding signatures (or fingerprints) generated from the data blocks. The one or more electronic files may include an electronic file, such as a virtual disk file associated with a virtual machine or a database file associated with a database. As depicted, at time T0, a first point in time version of an electronic file that includes data blocks D422-D427 has been captured. In one example, the data blocks D422-D427 may comprise the entirety of the electronic file at the first point in time. In another example, the data blocks D422-D427 may comprise data blocks of the electronic file that were modified or created between the first point in time and a point in time prior to the first point in time corresponding with a prior snapshot of the electronic file. Each of the data blocks D422-D427 may comprise a data block of a fixed data block size (e.g., each data block of the six data blocks may comprise a 64 KB, 128 KB, 256 KB, 512 KB, or 1 GB data block).

A set of data block signatures S422-S427 may be generated corresponding with the data blocks D422-D427. The set of data block signatures S422-S427 may be generated using a snapshot agent, such as snapshot agent 404 in FIG. 4A. The set of data block signatures S422-S427 may be generated using a first signature generation method, which may comprise a digital signature algorithm or a cryptographic hash algorithm such as MD5, SHA-1, SHA-256, or SHA-512. In one example, signature S422 may be generated via application of the first signature generation method to the data block D422, signature S423 may be generated via application of the first signature generation method to the data block D423, and signature S427 may be generated via application of the first signature generation method to the data block D427. In the case that the first point in time (time T0) version of the electronic file corresponds with the initial snapshot of the electronic file, then the six data blocks D422-D427 may comprise a complete copy of the electronic file at the first point in time. In some cases, the data blocks D422-D427 and/or the set of data block signatures S422-S427 may be transferred from the snapshot agent 404 in FIG. 4A to the storage appliance 411 in FIG. 4A in response to instructions provided to the snapshot agent 404 from the storage appliance 411.

At time T1, a second point in time version of the electronic file that includes data blocks D422-D423, D434, D425-D426, and D437 not depicted has been captured. A set of data block signatures S422-S423, S434, S425-S426, and S437 may be generated corresponding with the data blocks D422-D423, D434, D425-D426, and D437. By comparing the set of data block signatures S422-S427 at time T0 with the set of data block signatures S422-S423, S434, S425-S426, and S437 at time T1, the changed data blocks D434 and D437 may be identified due to mismatched signatures for those data blocks. For example, the changed data block D434 may be identified as a data block in which data changes occurred between time T0 and T1 because the signature S424 at time T0 is different from the signature S434 for the same data block. As the data blocks D422-D427 may have been previously transferred to a storage appliance, such as storage appliance 411 in FIG. 4A, the only data blocks that need to be transferred to the storage appliance are the changed data blocks D434 and D437. In some cases, for the second point in time version of the electronic file to be backed up by the storage appliance, the changed data blocks D434 and D437 and/or the set of data block signatures S422-S423, S434, S425-S426, and S437 may be transferred from the snapshot agent 404 in FIG. 4A to the storage appliance 411 in FIG. 4A.

At time T2, a third point in time version of the electronic file that includes data blocks D422-D423, D444, D425, D446, and D437 not depicted has been captured. A snapshot agent may detect that the signature generation method for generating data block signatures is to be changed from a first signature generation method to a second signature generation method different from the first signature generation method. The first signature generation method may comprise MD5 or SHA-1 and the second signature generation method may comprise SHA-256 or SHA-512. In this case, a first set of data block signatures S422-S423, S444, S425, S446, and S437 corresponding with data blocks D422-D423, D444, D425, D446, and D437 may be generated using the first signature generation method and a second set of data block signatures M422-M423, M444, M425, M446, and M437 also corresponding with data blocks D422-D423, D444, D425, D446, and D437 may be generated using the second signature generation method. By comparing the first set of data block signatures S422-S423, S444, S425, S446, and S437 at time T2 with the set of data block signatures S422-S423, S434, S425-S426, and S437 at time T1, the changed data blocks D444 and D446 may be identified due to mismatched signatures for those data blocks. For example, the changed data block D444 may be identified as a data block in which data changes occurred between time T1 and T2 because the signature S434 at time T1 is different from the signature S444 at time T2 for the same data block. For the third point in time version of the electronic file, the only data blocks that need to be transferred to the storage appliance are the changed data blocks D444 and D446. In some cases, for the third point in time version of the electronic file to be backed up by the storage appliance, the changed data blocks D444 and D446 and/or the first set of data block signatures S422-S423, S444, S425, S446, and S437 may be transferred from the snapshot agent 404 in FIG. 4A to the storage appliance 411 in FIG. 4A.

In one embodiment, the change in the signature generation method or the algorithm for generating fingerprints for data blocks may require that two sets of signatures be generated for the same set of data blocks; in this case, a first set of signatures may be generated for the set of data blocks using the old signature generation method (e.g., MD5) and a second set of signatures may be generated for the set of data blocks using the new signature generation method (e.g., SHA-256). The snapshot agent may detect that the change in the signature generation method should occur due to the file size of the electronic file (e.g., by detecting that the file size is greater than or less than a threshold file size) and/or the amount of time that has passed since the previous snapshot of the electronic file was captured (e.g., by detecting that the amount of time that has passed since the previous snapshot is greater than a threshold amount of time).

At time T3, a fourth point in time version of the electronic file that includes data blocks D452, D423, D444, D455, D456, and D437 not depicted has been captured. A set of data block signatures M452, M423, M444, M455, M456, and M437 corresponding with data blocks D452, D423, D444, D455, D456, and D437 may be generated using the second signature generation method. By comparing the second set of data block signatures M422-M423, M444, M425, M446, and M437 at time T2 with the set of data block signatures M452, M423, M444, M455, M456, and M437 at time T3, the changed data blocks D452 and D455-D456 may be identified due to mismatched signatures for those data blocks. For example, the changed data block D452 may be identified as a data block in which data changes occurred between times T2 and T3 because the signature M422 at time T2 is different from the signature M452 at time T3 for the same data block. Similarly, the changed data block D455 may be identified as a data block in which data changes occurred between times T2 and T3 because the signature M425 at time T2 is different from the signature M455 at time T3 for the same data block. For the fourth point in time version of the electronic file, the only data blocks that need to be transferred to the storage appliance are the changed data blocks D452 and D455-D456. In some cases, for the fourth point in time version of the electronic file to be backed up by the storage appliance, the changed data blocks D452 and D455-D456 and/or the set of data block signatures M452, M423, M444, M455, M456, and M437 may be transferred from the snapshot agent 404 in FIG. 4A to the storage appliance 411 in FIG. 4A.

Figure 4C:
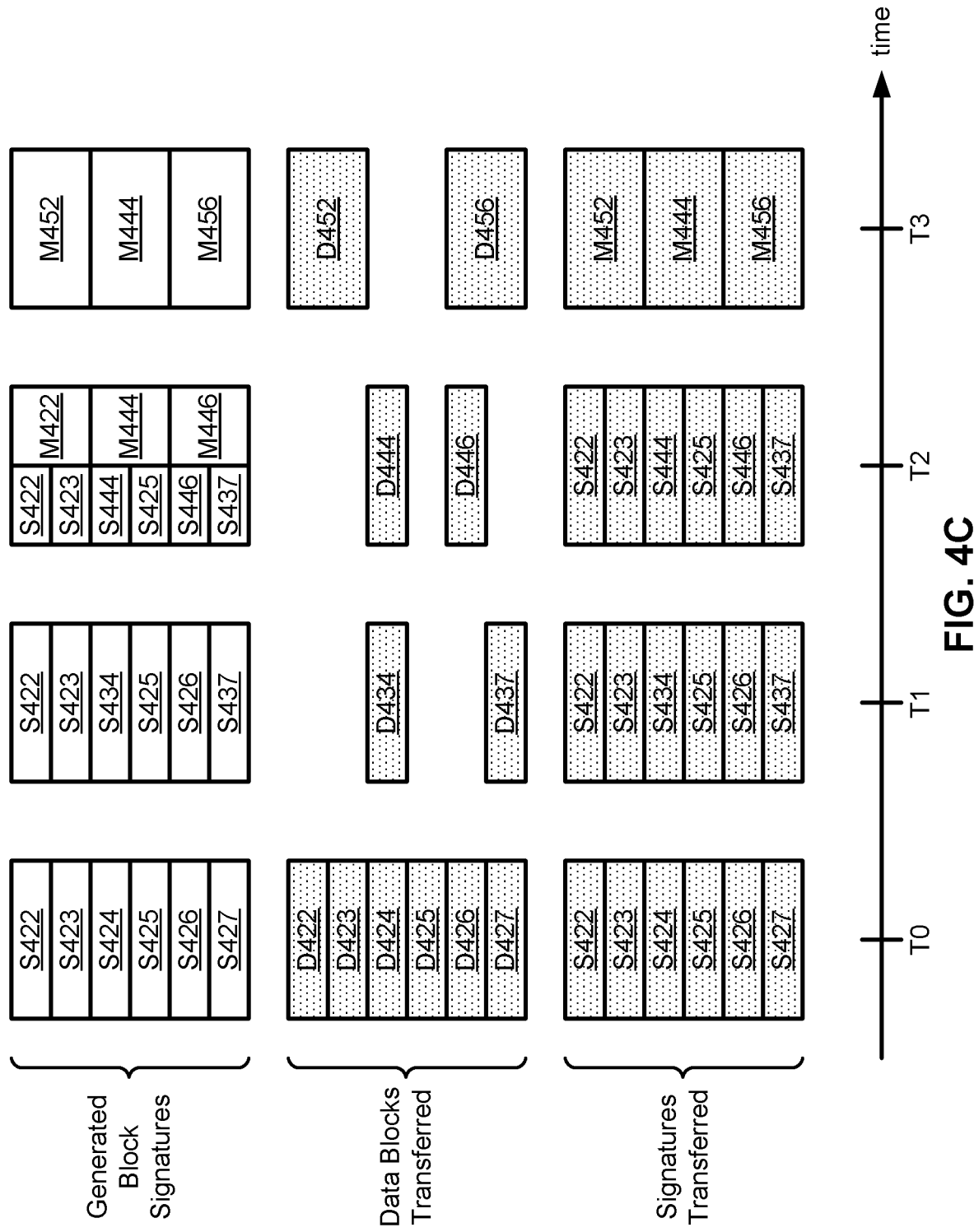
FIG. 4C depicts another embodiment of data blocks corresponding with portions of one or more electronic files at four different points in time and corresponding signatures generated from the data blocks.

FIG. 4C depicts one embodiment of data blocks corresponding with portions of one or more electronic files at four different points in time and corresponding signatures (or fingerprints) generated from the data blocks. The one or more electronic files may include an electronic file, such as a virtual disk file associated with a virtual machine or a database file associated with a database. As depicted, the data blocks and the corresponding signatures generated from the data blocks at times T0 and T1 may be the same as those depicted in FIG. 4B. The data blocks at times T0 and T1 may be identified by a snapshot agent and then transferred to a storage appliance to provide incremental backups for the electronic file.

At time T2, a third point in time version of the electronic file that includes data blocks D422-D423, D444, D425, D446, and D437 not depicted has been captured. A snapshot agent may detect that the size of the data blocks for which signatures are generated is to be adjusted (e.g., increased) based on a file size of the electronic file, the type of signature generation method being applied to the data blocks, and/or the amount of time that has passed since the previous snapshot was captured. In this case, a first set of data block signatures S422-S423, S444, S425, S446, and S437 corresponding with data blocks D422-D423, D444, D425, D446, and D437 of a first data block size (e.g., 64 KB) may be generated using a particular signature generation method (e.g., SHA-256) and a second set of data block signatures M422, M444, and M446 corresponding with a first data block comprising the data from data blocks D422 and D423, a second data block comprising the data from data blocks D444 and D425, and a third data block comprising the data from data blocks D446 and D437 may be generated using the particular signature generation method. The data block size (e.g., 128 KB) of the first data block, the second data block, and the third data block may be greater than the first data block size (e.g., 64 KB) used for generating the first set of data block signatures S422-S423, S444, S425, S446, and S437.

By comparing the first set of data block signatures S422-S423, S444, S425, S446, and S437 at time T2 with the set of data block signatures S422-S423, S434, S425-S426, and S437 at time T1, the changed data blocks D444 and D446 may be identified due to mismatched signatures for those data blocks. For the third point in time version of the electronic file, the only data blocks that need to be transferred from the snapshot agent to the storage appliance are the changed data blocks D444 and D446.

At time T3, a fourth point in time version of the electronic file that includes three data blocks that are greater than (e.g., two times) the size of the data blocks used to generate the first set of data block signatures S422-S423, S444, S425, S446, and S437 at time T2 is captured. A set of data block signatures M452, M444, and M456 corresponding with the three data block may be generated using the particular signature generation method. By comparing the second set of data block signatures M422, M444, and M446 at time T2 with the set of data block signatures M452, M444, and M456 at time T3, the changed data blocks D452 and D456 may be identified due to mismatched signatures for those data blocks. For example, the changed data block D452 may be identified as a data block in which data changes occurred between times T2 and T3 because the signature M422 at time T2 is different from the signature M452 at time T3 for the same data block. Similarly, the changed data block D456 may be identified as a data block in which data changes occurred between times T2 and T3 because the signature M446 at time T2 is different from the signature M456 at time T3 for the same data block. For the fourth point in time version of the electronic file, the only data blocks that need to be transferred to the storage appliance are the changed data blocks D452 and D456. In some cases, for the fourth point in time version of the electronic file to be backed up by the storage appliance, the changed data blocks D452 and D456 and/or the set of data block signatures M452, M444, and M456 may be transferred from the snapshot agent 404 in FIG. 4A to the storage appliance 411 in FIG. 4A.

In some embodiments, the snapshot agent may determine that both the signature generation method and the size of the data blocks are to be changed based on the file size of the electronic file (e.g., by detecting that the file size is greater than 1 GB) and/or the amount of time that has passed since the previous snapshot of the electronic file was captured (e.g., by detecting that the amount of time that has passed since the previous snapshot is greater than one hour). In one example, the size of the data blocks may be increased by two times and the signature generation method may be changed from SHA-1 to SHA-256 if the file size of the electronic file grows above 1 GB.

Figure 5A:
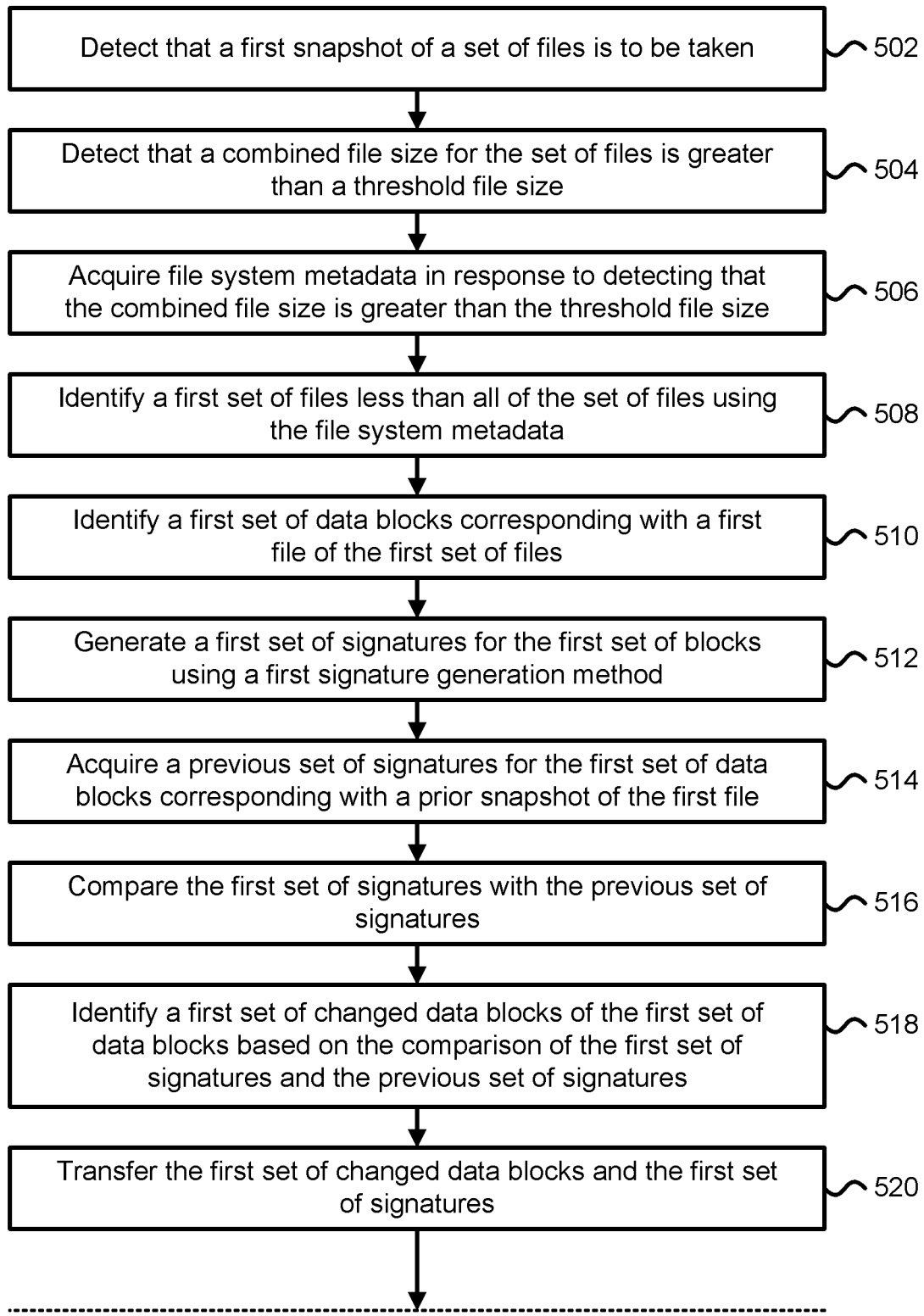
FIGS. 5A-5C depict a flowchart describing one embodiment of a process for identifying changed data blocks and varying the signature generation method for identifying the changed data blocks over time using a snapshot agent.
Figure 5B:
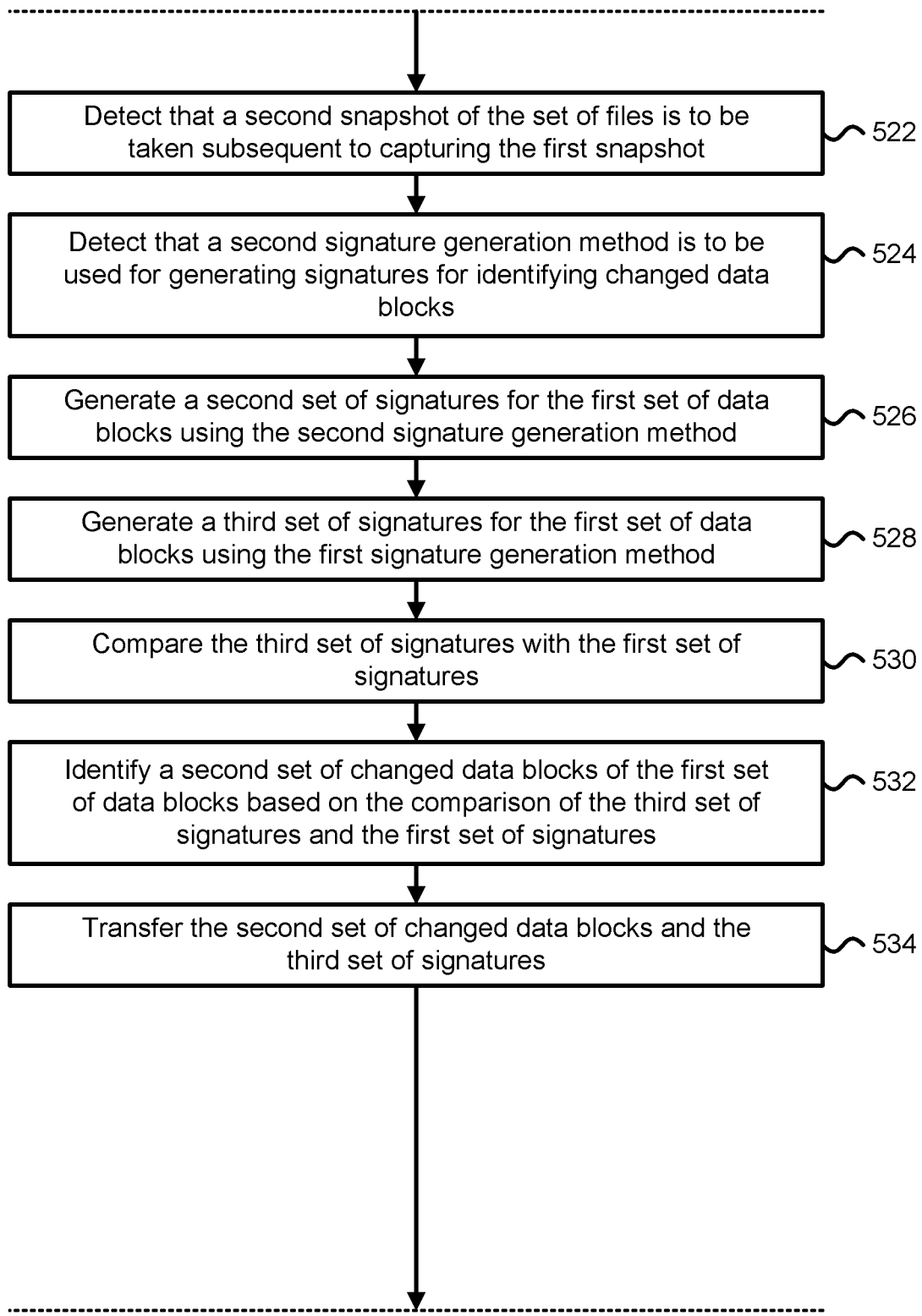
Figure 5C:
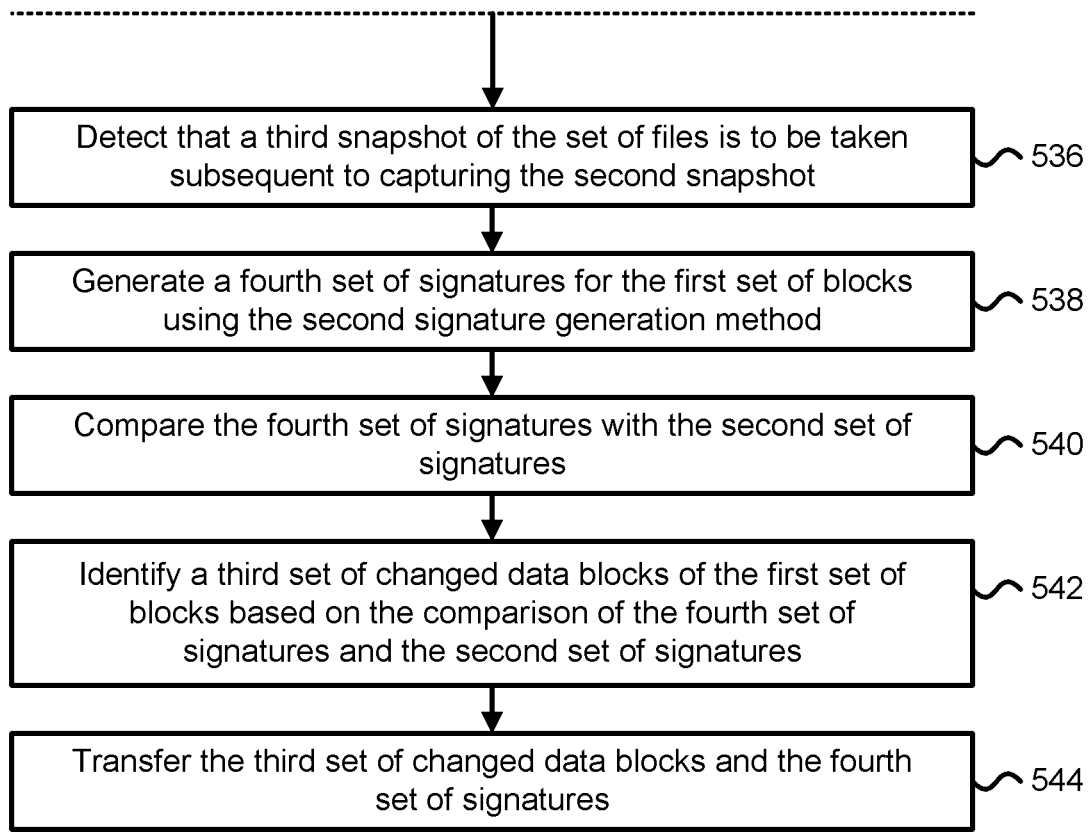

FIGS. 5A-5C depict a flowchart describing one embodiment of a process for identifying changed data blocks and varying the signature generation method for identifying the changed data blocks over time using a snapshot agent. In one embodiment, the process of FIGS. 5A-5C may be performed by a snapshot agent or a snapshot computing application, such as snapshot agent 404 in FIG. 4A.

In step 502, it is detected that a first snapshot of a set of files is to be taken or captured. The set of files may correspond with or include a virtual disk file for a virtual machine or a database file for a database. In step 504, it is detected that a combined file size for the set of files is greater than a threshold file size. In one example, the set of files may comprise two electronic files and it may be detected that the combined file size for the two electronic files is greater than 1 GB. In step 506, file system metadata is acquired in response to detecting that the combined file size is greater than the threshold file size. The file system metadata may be acquired from a directory-level table or a system-level table for a file system managing the set of files. The file system metadata may include metadata information associated with each file stored using the file system including the sizes of the files and time stamps for when the files were first created, last accessed, and/or last modified.

In step 508, a first set of files less than all of the set of files is identified using the file system metadata. In one embodiment, the first set of files may comprise files that were created or modified since a prior snapshot of the set of files that immediately preceded the first snapshot. In step 510, a first set of data blocks corresponding with a first file of the first set of files is identified. Each data block of the first set of data blocks may be of a particular data block size (e.g., 64 KB). In step 512, a first set of signatures is generated for the first set of data blocks using a first signature generation method. The first set of signatures may comprise a first set of fingerprints. The first signature generation method may comprise a cryptographic hash algorithm such as MD5 or SHA-256.

In step 514, a previous set of signatures for the first set of data blocks corresponding with a prior snapshot of the first file is acquired. In step 516, the first set of signatures are compared with the previous set of signatures. In step 518, a first set of changed data blocks of the first set of blocks is identified based on the comparison of the first set of signatures and the previous set of signatures. The first set of changed data blocks may correspond with data blocks of the first set of data blocks in which a signature mismatch occurred. The first set of signatures may correspond with the set of data block signatures S422-S423, S434, S425-S426, and S437 at time T1 in FIG. 4B and the previous set of signatures may correspond with the set of data block signatures S422-S427 at time T0 in FIG. 4B. In step 520, the first set of changed data blocks and/or the first of signatures are transferred. The first set of changed data blocks may be transferred to a storage appliance, such as stored appliance 411 in FIG. 4A. The first set of changed data blocks may correspond with data blocks D434 and D437 at time T1 of FIG. 4B.

In step 522, it is detected that a second snapshot of the set of files is to be taken or captured subsequent to capturing the first snapshot. In step 524, it is detected that a second signature generation method is to be used for generating signatures for identifying changed data blocks. In step 526, a second set of signatures for the first set of data blocks is generated using the second signature generation method. In step 528, a third set of signatures for the first set of data blocks is generated using the first signature generation method. In one example, the first signature generation method may comprise MD5 and the second signature generation method may comprise SHA-256. In step 530, the third set of signatures is compared with the first set of signatures. In step 532, a second set of changed data blocks of the first set of data blocks is identified based on the comparison of the third set of signatures and the first set of signatures. The first set of signatures may correspond with the set of data block signatures S422-S423, S434, S425-S426, and S437 at time T1 in FIG. 4B and the third set of signatures may correspond with the set of data block signatures S422-S423, S444, S425, S446, and S437 at time T2 in FIG. 4B. In step 534, the second set of changed data blocks and/or the third set of signatures are transferred. The second set of changed data blocks may be transferred to a storage appliance, such as stored appliance 411 in FIG. 4A. The second set of changed data blocks may correspond with data blocks D444 and D446 at time T2 of FIG. 4B.

In step 536, it is detected that a third snapshot of the set of files is to be taken or captured subsequent to capturing the second snapshot. In step 538, a fourth set of signatures for the first set of data blocks is generated using the second signature generation method. In step 540, the fourth set of signatures is compared with the second set of signatures. In step 542, a third set of changed data blocks of the first set of data blocks is identified based on the comparison of the fourth set of signatures and the second set of signatures. The fourth set of signatures may correspond with the set of data block signatures M452, M423, M444, M455, M456, and M437 at time T3 in FIG. 4B and the second set of signatures may correspond with the set of data block signatures M422-M423, M444, M425, M446, and M437 at time T2 in FIG. 4B. In step 544, the third set of changed data blocks and/or the fourth set of signatures is transferred. The third set of changed data blocks may be transferred to a storage appliance, such as stored appliance 411 in FIG. 4A. The third set of changed data blocks may correspond with data blocks D452 and D455-D456 at time T3 in FIG. 4B.

Figure 5D:
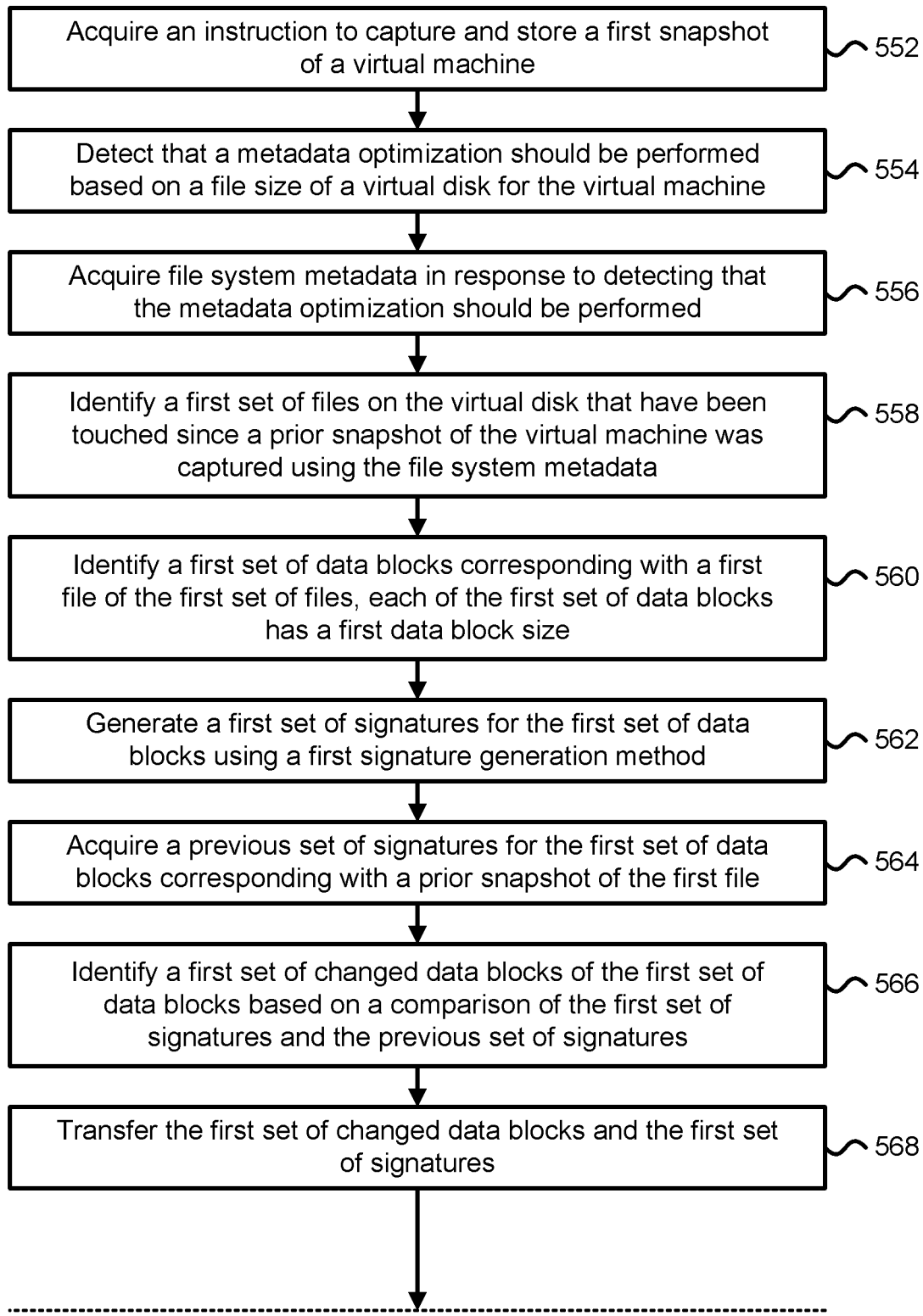
FIGS. 5D-5F depict a flowchart describing one embodiment of a process for identifying changed data blocks and varying the data block size over time using a snapshot agent.
Figure 5E:
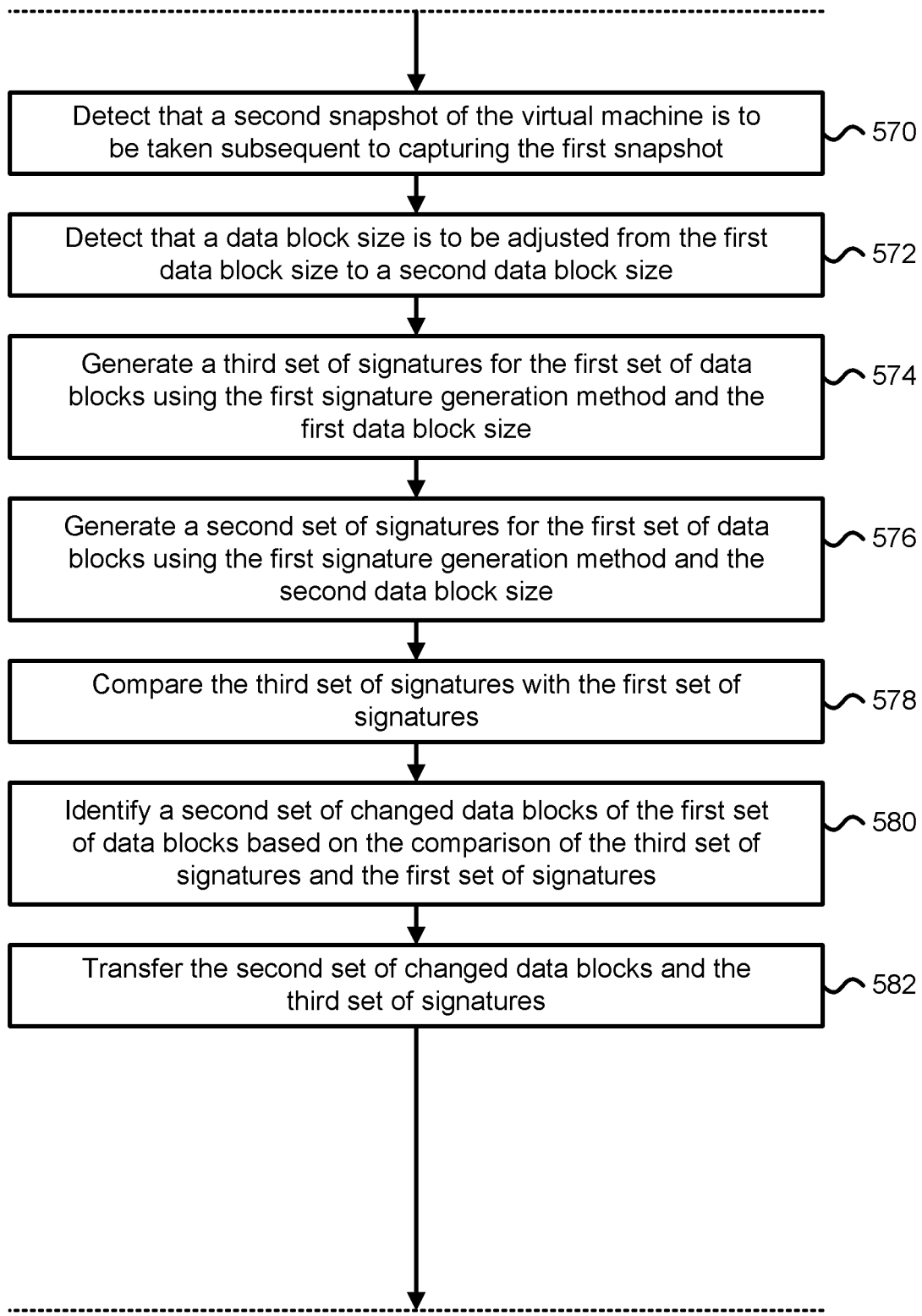
Figure 5F:
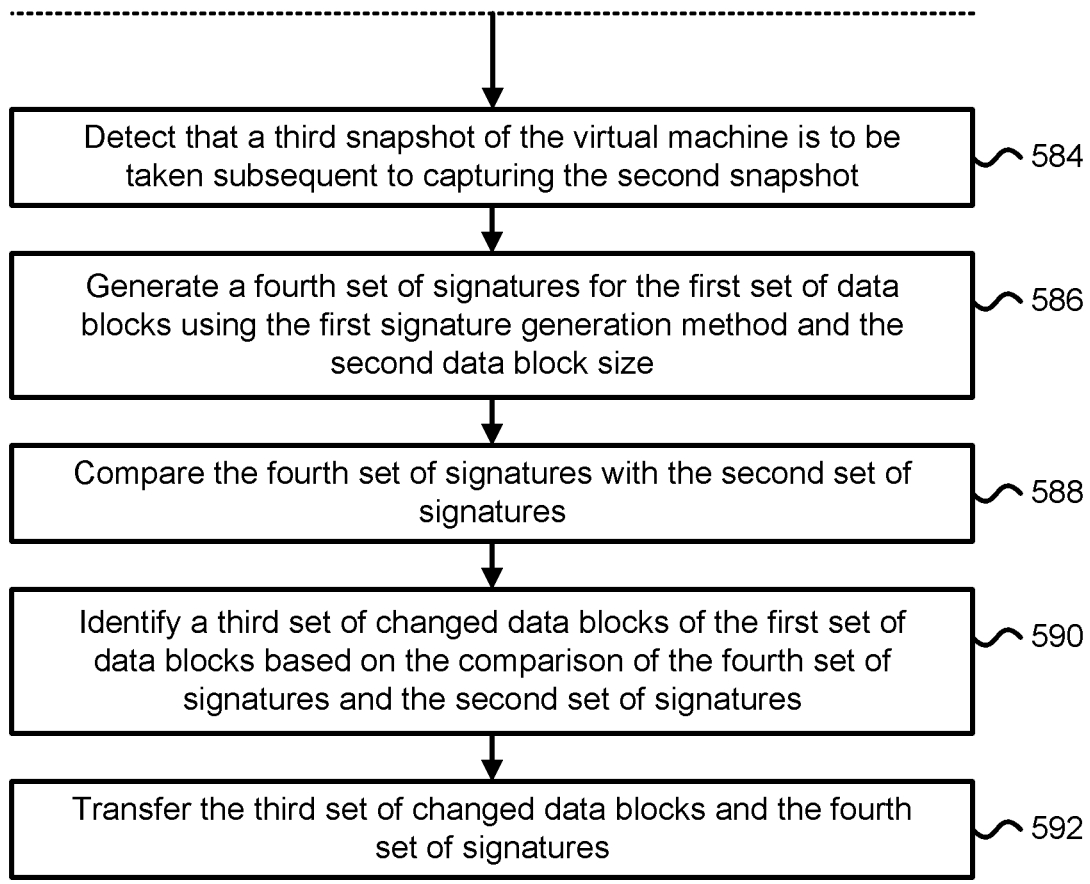

FIGS. 5D-5F depict a flowchart describing one embodiment of a process for identifying changed data blocks and varying the data block size over time using a snapshot agent. In one embodiment, the process of FIGS. 5D-5F may be performed by a snapshot agent or a snapshot computing application, such as snapshot agent 404 in FIG. 4A.

In step 552, an instruction to capture and store a first snapshot of a virtual machine is acquired. The instruction may be acquired from a storage appliance, such as storage appliance 411 in FIG. 4A and the storage appliance may determine when the snapshot agent acquires snapshot information for the virtual machine and transfers changed data blocks to the storage appliance. In step 554, it is detected that a metadata optimization should be performed based on a file size of a virtual disk file for the virtual machine. In step 556, file system metadata is acquired in response to detecting that the metadata optimization should be performed. The file system metadata may include metadata information associated with files stored using a file system including the sizes of the files and time stamps for when the files were first created, last accessed, and/or last modified. In step 558, a first set of files on the virtual disk that have been touched or modified since a prior snapshot of the virtual machine was captured is identified using the file system metadata. In step 560, a first set of data blocks corresponding with a first file of the first set of files is identified. Each data block of the first set of data blocks may be of a first data block size (e.g., 64 KB). In step 562, a first set of signatures for the first set of data blocks is generated using a first signature generation method. The first signature generation method may comprise MD5, SHA-1, or SHA-256.

In step 564, a previous set of signatures for the first set of data blocks corresponding with a prior snapshot of the first file is acquired. In step 566, a first set of changed data blocks of the first set of data blocks is identified based on a comparison of the first set of signatures and the previous set of signatures. The first set of signatures may correspond with the set of data block signatures S422-S423, S434, S425-S426, and S437 at time T1 in FIG. 4C and the previous set of signatures may correspond with the set of data block signatures S422-S427 at time T0 in FIG. 4C. In step 568, the first set of changed data blocks and/or the first set of signatures are transferred. The first set of changed data blocks may correspond with data blocks D434 and D437 at time T1 in FIG. 4C.

In step 570, it is detected that a second snapshot of the virtual machine is to be taken or captured subsequent to capturing the first snapshot. In step 572, it is detected that a data block size is to be adjusted from the first data block size to a second data block size different from the first data block size. In one example, the first data block size may be greater than the second data block size. In another example, the first data block size (e.g., 64 KB) may be less than the second data block size (e.g., 128 KB). In step 574, a third set of signatures is generated for the first set of data blocks using the first signature generation method and the first data block size. In step 576, a second set of signatures for the first set of data blocks is generated using the first signature generation method and the second data block size. The second set of signatures may correspond with the set of data block signatures M422, M444, and M446 at time T2 in FIG. 4C and the third set of signatures may correspond with the set of data block signatures S422-S423, S444, S425, S446, and S437 at time T2 in FIG. 4C. The first set of signatures may correspond with the set of data block signatures S422-S423, S434, S425-S426, and S437 at time T1 in FIG. 4C. In step 578, the third set of signatures is compared with the first set of signatures. In step 580, a second set of changed data blocks of the first set of data blocks is identified based on the comparison of the third set of signatures and the first set of signatures. In step 582, the second set of changed data blocks and/or the third set of signatures are transferred. The second set of changed data blocks may correspond with data blocks D444 and D446 at time T2 in FIG. 4C.

In step 584, it is detected that a third snapshot of the virtual machine is to be taken or captured subsequent to capturing the second snapshot. In step 586, a fourth set of signatures for the first set of data blocks is generated using the first signature generation method and the second data block size. In step 588, the fourth set of signatures is compared with the second set of signatures. In step 590, a third set of changed data blocks of the first set of data blocks is identified based on the comparison of the fourth set of signatures and the second set of signatures. The second set of signatures may correspond with the set of data block signatures M422, M444, and M446 at time T2 in FIG. 4C and the fourth set of signatures may correspond with the set of data block signatures M452, M444, and M456 at time T3 in FIG. 4C. In step 592, the third set of changed data blocks and/or the fourth set of signatures are transferred. The fourth set of changed data blocks may correspond with data blocks D452 and D456 at time T3 in FIG. 4C.

One embodiment of the disclosed technology includes acquiring an instruction to transfer a second set of changed data blocks associated with a second snapshot of an electronic file to a data storage appliance. The second snapshot of the electronic file corresponds with a second point in time version of the electronic file. The method further comprising acquiring a first set of signatures corresponding with a portion of the electronic file at a first point in time prior to the second point in time, generating a second set of signatures for the portion of the electronic file at the second point in time using a first signature generation method, generating a third set of signatures for the portion of the electronic file at the second point in time using a second signature generation method different from the first signature generation method, identifying the second set of changed data blocks based on a comparison of the first set of signatures and the second set of signatures, transferring the second set of changed data blocks to the data storage appliance, and acquiring an instruction to transfer a third set of changed data blocks associated with a third snapshot of the electronic file to the data storage appliance. The third snapshot of the electronic file corresponds with a third point in time version of the electronic file. The method further comprises generating a fourth set of signatures for the portion of the electronic file at the third point in time using the second signature generation method, identifying the third set of changed data blocks based on a comparison of the third set of signatures and the fourth set of signatures, and transferring the third set of changed data blocks to the data storage appliance.

One embodiment of the disclosed technology includes acquiring an instruction to transfer a second set of changed data blocks of a set of data blocks associated with a second point in time version of an electronic file, acquiring a first set of signatures corresponding with the set of data blocks at a first point in time prior to the second point in time, generating a second set of signatures for the set of data blocks at the second point in time using a first signature generation method, generating a third set of signatures for the set of data blocks at the second point in time using a second signature generation method different from the first signature generation method, identifying the second set of changed data blocks based on a comparison of the first set of signatures and the second set of signatures, transferring the second set of changed data blocks to a computing device, acquiring an instruction to transfer a third set of changed data blocks of the set of data blocks associated with a third point in time version of the electronic file, generating a fourth set of signatures for the set of data blocks at the third point in time using the second signature generation method, identifying the third set of changed data blocks based on a comparison of the third set of signatures and the fourth set of signatures, and transferring the third set of changed data blocks to the computing device.

One embodiment of the disclosed technology includes a memory (e.g., a volatile or non-volatile memory) in communication with one or more processors. The memory configured to store a first set of signatures corresponding with a portion of an electronic file at a first point in time. The one or more processors configured to acquire an instruction to transfer a second set of changed data blocks associated with a second snapshot of the electronic file to a data storage appliance. The second snapshot of the electronic file corresponds with a second point in time subsequent to the first point in time. The one or more processors configured to generate a second set of signatures for the portion of the electronic file at the second point in time using a first signature generation method and generate a third set of signatures for the portion of the electronic file at the second point in time using a second signature generation method different from the first signature generation method. The one or more processors configured to identify the second set of changed data blocks based on a comparison of the first set of signatures and the second set of signatures and transfer the second set of changed data blocks to the data storage appliance. The one or more processors configured to acquire an instruction to transfer a third set of changed data blocks associated with a third snapshot of the electronic file to the data storage appliance. The third snapshot of the electronic file corresponds with a third point in time subsequent to the second point in time. The one or more processors configured to generate a fourth set of signatures for the portion of the electronic file at the third point in time using the second signature generation method. The one or more processors configured to identify the third set of changed data blocks based on a comparison of the third set of signatures and the fourth set of signatures and transfer the third set of changed data blocks to the data storage appliance.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
    acquiring an instruction to transfer a second set of changed data blocks associated with a second snapshot of an electronic file to a data storage appliance, the second snapshot of the electronic file corresponds with a second point in time version of the electronic file;
    acquiring a first set of signatures corresponding with a portion of the electronic file at a first point in time prior to the second point in time, wherein the first set of signatures has been generated using a first signature generation method;
    generating a second set of signatures for the portion of the electronic file at the second point in time using the first signature generation method;
    determining whether or not a file size of the electronic file is greater than a threshold file size and whether or not an amount of time between a first snapshot of the electronic file captured at the first point in time and the second snapshot of the electronic file has exceeded a threshold amount of time;
    determining that a second signature generation method, which is different from the first signature generation method, should be applied to subsequent snapshots of the electronic file in response to detecting that the file size of the electronic file is greater than the threshold file size, or the amount of time between the first snapshot and the second snapshot has exceeded the threshold amount of time, or both the file size of the electronic file is greater than the threshold file size and the amount of time between the first snapshot and the second snapshot has exceeded the threshold amount of time;
    generating a third set of signatures for the portion of the electronic file at the second point in time using the second signature generation method;
    identifying the second set of changed data blocks based on a comparison of the first set of signatures and the second set of signatures;
    transferring the second set of changed data blocks to the data storage appliance;
    acquiring an instruction to transfer a third set of changed data blocks associated with a third snapshot of the electronic file to the data storage appliance, the third snapshot of the electronic file corresponds with a third point in time version of the electronic file;
    generating a fourth set of signatures for the portion of the electronic file at the third point in time using the second signature generation method;

identifying the third set of changed data blocks based on a comparison of the third set of signatures and the fourth set of signatures; and transferring the third set of changed data blocks to the data storage appliance.

2. The method of claim 1, further comprising:

detecting that the third set of signatures for the portion of the electronic file should correspond with data blocks of a second data block size different from a first data block size used for generating the second set of signatures in response to detecting that the file size of the electronic file is greater than the threshold file size.

3. The method of claim 2, wherein:

the second data block size is greater than the first data block size.

4. The method of claim 1, further comprising:

acquiring file system metadata in response to detecting that the file size of the electronic file is greater than the threshold file size; and identifying the portion of the electronic file using the file system metadata.

5. The method of claim 4, wherein:

the file system metadata includes a timestamp associated with when the electronic file was last modified.

6. The method of claim 1, wherein:

the electronic file comprises one of a database file or a virtual disk file.

7. The method of claim 1, wherein:

the first signature generation method comprises a first cryptographic hash algorithm; and the second signature generation method comprises a second cryptographic hash algorithm different from the first cryptographic hash algorithm.

8. The method of claim 7, wherein:

the first cryptographic hash algorithm comprises MD5; and the second cryptographic hash algorithm comprises SHA-256.

9. A data management system, comprising:

a memory configured to store a first set of signatures corresponding with a portion of an electronic file at a first point in time, wherein the first set of signatures has been generated using a first signature generation method; and one or more processors configured to acquire an instruction to transfer a second set of changed data blocks associated with a second snapshot of the electronic file to a data storage appliance, the second snapshot of the electronic file corresponding with a second point in time subsequent to the first point in time;

the one or more processors configured to generate a second set of signatures for the portion of the electronic file at the second point in time using the first signature generation method;

the one or more processors configured to:

determine whether or not a file size of the electronic file is greater than a threshold file size and whether or not an amount of time between a first snapshot of the electronic file captured at the first point in time and the second snapshot of the electronic file has exceeded a threshold amount of time;

determine that a second signature generation method should be applied to subsequent snapshots of the electronic file in response to detecting that the file size of the electronic file is greater than the threshold file size, or the amount of time between the first snapshot and the second snapshot has exceeded the threshold amount of time, or both the file size of the electronic file is greater than the threshold file size and the amount of time between the first snapshot and the second snapshot has exceeded the threshold amount of time;

the one or more processors configured to generate a third set of signatures for the portion of the electronic file at the second point in time using the second signature generation method;

the one or more processors configured to identify the second set of changed data blocks based on a comparison of the first set of signatures and the second set of signatures and transfer the second set of changed data blocks to the data storage appliance, the one or more processors configured to acquire an instruction to transfer a third set of changed data blocks associated with a third snapshot of the electronic file to the data storage appliance, the third snapshot of the electronic file corresponds with a third point in time subsequent to the second point in time, the one or more processors configured to generate a fourth set of signatures for the portion of the electronic file at the third point in time using the second signature generation method, the one or more processors configured to identify the third set of changed data blocks based on a comparison of the third set of signatures and the fourth set of signatures and transfer the third set of changed data blocks to the data storage appliance.

10. The data management system of claim 9, wherein:

the one or more processors are configured to acquire file system metadata for the electronic file and identify the electronic file using the file system metadata.

11. The data management system of claim 10, wherein:

the file system metadata includes timestamp information of when the electronic file was last modified.

12. The data management system of claim 9, wherein:

the electronic file comprises one of a database file or a virtual disk file.

13. The data management system of claim 9, wherein:

the first signature generation method comprises a first cryptographic hash algorithm; and the second signature generation method comprises a second cryptographic hash algorithm different from the first cryptographic hash algorithm.

14. The data management system of claim 13, wherein:

the first cryptographic hash algorithm comprises SHA-1; and the second cryptographic hash algorithm comprises SHA-256.

15. A method for operating a data management system, comprising:

acquiring an instruction to transfer a second set of changed data blocks of a set of data blocks associated with a second point in time version of an electronic file;

acquiring a first set of signatures corresponding with the set of data blocks at a first point in time prior to the second point in time, wherein the first set of signatures has been generated using a first signature generation method;

generating a second set of signatures for the set of data blocks at the second point in time using the first signature generation method;

determining whether or not a file size of the electronic file is greater than a threshold file size and whether or not an amount of time between a first snapshot of the electronic file captured at the first point in time and a second snapshot captured at the second point in time of the electronic file has exceeded a threshold amount of time;

determining that a second signature generation method should be applied to subsequent snapshots of the electronic file in response to detecting that the file size of the electronic file is greater than the threshold file size, or the amount of time between the first snapshot and the second snapshot has exceeded the threshold amount of time, or both the file size of the electronic file is greater than the threshold file size and the amount of time between the first snapshot and the second snapshot has exceeded the threshold amount of time;

generating a third set of signatures for the set of data blocks at the second point in time using the second signature generation method;

identifying the second set of changed data blocks based on a comparison of the first set of signatures and the second set of signatures;

transferring the second set of changed data blocks to a computing device;

acquiring an instruction to transfer a third set of changed data blocks of the set of data blocks associated with a third point in time version of the electronic file;

generating a fourth set of signatures for the set of data blocks at the third point in time using the second signature generation method;

identifying the third set of changed data blocks based on a comparison of the third set of signatures and the fourth set of signatures; and transferring the third set of changed data blocks to the computing device.

\* \* \* \* \*

UNITED STATES PATENT AND TRADEMARK OFFICE
CERTIFICATE OF CORRECTION

PATENT NO. : 10,719,405 B2  
APPLICATION NO. : 15/837998  
DATED : July 21, 2020  
INVENTOR(S) : Luo et al.

Page 1 of 1

It is certified that error appears in the above-identified patent and that said Letters Patent is hereby corrected as shown below:

In the Specification

In Column 14, Line 62, delete "storage device" and insert --cloud storage-- therefor In Column 14, Line 63, delete "Storage device" and insert --Cloud storage-- therefor In Column 21, Line 26, delete "files." and insert --files).-- therefor Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*